United States Patent [19]

Maeda et al.

[11] Patent Number: 5,377,095
[45] Date of Patent: Dec. 27, 1994

[54] MERCHANDISE ANALYSIS SYSTEM WITH SALES DATA TABLE AND VARIOUS FUNCTIONS FOR PREDICTING THE SALE BY ITEM

[75] Inventors: Miyuki Maeda, Sagamihara; Hideki Nakata, Yokohama; Tadashi Tenma, Sagamihara; Shooji Shinoda, Yokohama, all of Japan

[73] Assignee: Hitachi, Ltd., Tokyo, Japan

[21] Appl. No.: 909,951

[22] Filed: Jul. 7, 1992

[30] Foreign Application Priority Data

Jul. 12, 1991 [JP] Japan .................. 3-198923

[51] Int. Cl.$^5$ .............................. G06F 15/21
[52] U.S. Cl. ..................... 364/401; 364/402
[58] Field of Search ............. 364/401, 402, 403, 404, 364/405, 406, 408

[56] References Cited

U.S. PATENT DOCUMENTS

| | | |
|---|---|---|
| 4,398,250 | 8/1983 | Hosono . |
| 4,843,546 | 6/1989 | Yoshida et al. . |
| 4,887,207 | 12/1989 | Natarajan ............. 364/401 |
| 4,908,761 | 3/1990 | Tai ....................... 364/402 |
| 4,928,279 | 5/1990 | Muroi . |
| 4,947,322 | 8/1990 | Tenma et al. ......... 364/401 |
| 4,972,504 | 11/1990 | Daniel, Jr. et al. . |
| 5,128,861 | 7/1992 | Kagami et al. ....... 364/403 |
| 5,168,445 | 12/1992 | Kawashima et al. . 364/403 |
| 5,245,533 | 9/1993 | Marshall .............. 364/401 |

*Primary Examiner*—Robert A. Weinhardt
*Attorney, Agent, or Firm*—Fay, Sharpe, Beall, Fagan, Minnich & McKee

[57] ABSTRACT

A merchandise analysis system for predicting the sale of a registered item, including: a sales data table having sales data of a plurality of items; an input terminal for registering an item and for setting an analysis term; a retrieval unit connected to the table and the input terminal to search the sales data table for the sales data corresponding to the registered item and the analysis term; a function table having various functions fitted to respective data of sale versus price; a dispersion measure table for storing errors obtained with respect to the respective data of sale versus price retrieved on the basis of the respective functions; an analysis device connected to the dispersion measure table so as to determine one function giving the minimum one of the errors and the values of parameters therefor; and a display connected to the dispersion measure table so as to display the sales data of the registered item corresponding to the analysis term in a graph expressing the determined one function into which the determined parameters are substituted, the display being arranged to display the predicted sale corresponding to the registered price inputted through the input terminal in accordance with the display of the sales data.

20 Claims, 44 Drawing Sheets

FIG. 7

SALE PREDICTION

ITEM CODE : _____

REGISTERED PRICE : _____

TERM OF DATA
    FOR ANALYSIS : _____
    _____

FIG. 8

SALE PREDICTION

ITEM CODE : 1 2 3 4 5 6 7 8

REGISTERED PRICE : 7 8 0

TERM OF DATA FOR ANALYSIS : 90.10.01
90.12.31

FIG. 10

SALES TABLE 131

| ITEM CODE | DATE | PRICE ($) | SALE |
|---|---|---|---|
| 10000000 | 90. 1. 1 | 1 0 | 0 |
| ⋮ | ⋮ | ⋮ | ⋮ |
| 12345677 | 90.12.31 | 3 0 | 5 3 |
| 12345678 | 90. 1. 1 | 1 1 0 | 3 |
| 12345678 | 90. 1. 2 | 1 1 0 | 5 |
| 12345678 | 90. 1. 3 | 8 0 | 2 0 |
| ⋮ | ⋮ | ⋮ | ⋮ |
| 12345678 | 90. 9.29 | 7 8 | 3 0 |
| 12345678 | 90. 9.30 | 7 8 | 2 4 |
| 12345678 | 90.10. 1 | 1 1 0 | 2 |
| 12345678 | 90.10. 2 | 1 1 0 | 1 |
| ⋮ | ⋮ | ⋮ | ⋮ |
| 12345678 | 90.12.30 | 1 1 0 | 5 |
| 12345678 | 90.12.31 | 1 1 0 | 3 |
| 12345679 | 90. 1. 1 | 1 0 | 6 9 |
| ⋮ | ⋮ | ⋮ | ⋮ |

| FUNCTION NO. | FUNCTION NAME | PARAMETER | EQUATION |
|---|---|---|---|
| 1 | LINEAR FUNCTION | a、b | $y = ax + b$ |
| 2 | EXPONENTIAL FUNCTION | a、b | $y = a * x * * b$ |

FIG. 12
CALCULATION OF PARAMETERS $$\left\{ \begin{array}{ll} x_i : \text{PRICE} & y_i : \text{SALE} \\ \hat{y}_i : \text{PREDICTED SALE} & \end{array} \right\}$$

$$F = \sum_{i=1}^{n} (\hat{y}_i - y_i)^2$$

$$= \sum_{i=1}^{n} (a x_i + b - y_i)^2$$

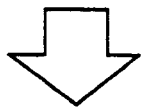

$$\left\{ \begin{array}{l} \dfrac{\partial F}{\partial a} = a \sum_{i=1}^{n} x_i^2 + b \sum_{i=1}^{n} x_i - \sum_{i=1}^{n} x_i y_i = 0 \\ \dfrac{\partial F}{\partial b} = a \sum_{i=1}^{n} x_i + nb - \sum_{i=1}^{n} y_i = 0 \end{array} \right.$$

$$\sum_{i=1}^{n} x_i^2 = S_{xx}, \quad \sum_{i=1}^{n} x_i y_i = S_{xy},$$

$$\sum_{i=1}^{n} x_i = S_x, \quad \sum_{i=1}^{n} y_i = S_y$$

$$\left\{ \begin{array}{l} S_{xx} \cdot a + S_x b = S_{xy} \\ S_x \cdot a + nb = S_y \end{array} \right.$$

$$\left( \begin{array}{l} a = \dfrac{nS_{xy} - S_x S_y}{nS_{xx} - S_x^2} \\ \\ b = \dfrac{S_y S_{xx} - S_x S_{xy}}{nS_{xx} - S_x^2} \end{array} \right)$$

FIG. 13

DISPERSION MEASURE TABLE

| FUNCTION NO. | EQUATION | DISPERSION MEASURE |
|---|---|---|
| 1 | y = -01.x+100.0 | 14.0 |
| 2 | y = 1.41028*x**-9.0 | 9.6 |

FIG. 17

STOCK TABLE

| ITEM CODE | STOCK |
|---|---|
| 1 0 0 0 0 0 0 0 | 1 |
|  |  |
| 1 2 3 4 5 6 7 7 | 1 0 0 |
| 1 2 3 4 5 6 7 8 | 1 3 |
| 1 2 3 4 5 6 7 9 | 5 9 |
|  |  |

FIG. 22

PRICE MATRIX TABLE 128

| DATE | PRICE | MATRIX |
|---|---|---|
| 90. 1. 1 | 1 1 0 | |
| 90. 1. 2 | 1 1 0 | 0 |
| ⋮ | | |
| 90.11.30 | 1 1 0 | 0 |
| 90.12. 1 | 1 0 0 | -1 |
| 90.12. 2 | 1 0 0 | 0 |
| 90.12. 3 | 1 0 0 | 0 |
| 90.12. 4 | 1 0 0 | 0 |
| 90.12. 5 | 8 0 | -0 |
| 90.12. 6 | 8 0 | 0 |
| 90.12. 7 | 8 0 | 0 |
| 90.12. 8 | 8 8 | 1 |
| ⋮ | | |
| 90.12.31 | 1 1 0 | 1 |
| 91. 1. 1 | 1 1 0 | 0 |
| 91. 1. 2 | 1 1 0 | 0 |
| 91. 1. 3 | 1 1 0 | 0 |
| 91. 1. 4 | 1 1 0 | 0 |
| 91. 1. 5 | 1 1 0 | 0 |
| 91. 1. 6 | 1 1 0 | 0 |
| 91. 1. 7 | 7 8 | -1 |

FIG. 27

BEFORE-PROCESSING TABLE

| WEEK NO | DATE | PRICE $ | SALE |
|---|---|---|---|
| 6 | 90.11.26 | 1 1 0 | 2 0 |
| ⋮ | | | |
| 6 | 90.12. 2 | 1 0 0 | 1 0 |
| 5 | 90.12. 3 | 1 0 0 | 1 0 |
| ⋮ | | | |
| 5 | 90.12. 8 | 8 8 | 1 1 |
| ⋮ | | | |
| ⋮ | | | |
| 2 | 90.12.30 | 1 1 0 | 9 |
| 1 | 90.12.31 | 1 1 0 | 1 1 |
| ⋮ | | | |
| 1 | 91. 1. 5 | 1 1 0 | 3 |
| 1 | 91. 1. 6 | 1 1 0 | 0 |

FIG. 28

AFTER-PROCESSING TABLE

| WEEK NO | DATE | PRICE $ | SALE |
|---|---|---|---|
| 6 | 90.11.26 | 1 1 0 | 20 |
| : | | | |
| 6 | 90.12. 2 | 1 0 0 | 10 |
| 5 | 90.12. 3 | 1 0 0 | 10 |
| 5 | 90.12. 3 | 1 0 0 | 10 |
| : | | | |
| 5 | 90.12. 8 | 8 8 | 11 |
| 5 | 90.12. 8 | 8 8 | 11 |
| : | | | |
| : | | | |
| 2 | 90.12.30 | 1 1 0 | 9 |
| 1 | 90.12.31 | 1 1 0 | 11 |
| 1 | 90.12.31 | 1 1 0 | 11 |
| 1 | 90.12.31 | 1 1 0 | 11 |
| 1 | 90.12.31 | 1 1 0 | 11 |
| 1 | 90.12.31 | 1 1 0 | 11 |
| 1 | 90.12.31 | 1 1 0 | 11 |
| : | | | |
| 1 | 91. 1. 6 | 1 1 0 | 0 |
| 1 | 91. 1. 6 | 1 1 0 | 0 |
| 1 | 91. 1. 6 | 1 1 0 | 0 |
| 1 | 91. 1. 6 | 1 1 0 | 0 |
| 1 | 91. 1. 6 | 1 1 0 | 0 |
| 1 | 91. 1. 6 | 1 1 0 | 0 |

FIG. 31

OPTIMUM PRICE PREDICTION

ITEM CODE : 1 2 3 4 5 6 7 8

REGISTERED UPPER-LIMIT PRICE : $ 1 0 0
REGISTERED LOWER-LIMIT PRICE : $ 7 0

TERM OF DATA FOR ANALYSIS : 90.10.01
90.12.31

FIG. 35

```
OPTIMUM PRICE PREDICTION

ITEM CODE :  9 2 3 4 5 6 7 8   HITACHI
                        ─────────────────   MILK

REGULAR PRICE :  $ 22.80
          DEAD STOCK :     50
          RESET TIME :     2 HOURS
MAXIMUM DISCOUNT SUM :     $   5.00
                        ─────────────────
TERM OF DATA FOR ANALYSIS : 90.10.01
                            ─────────
                            90.12.31
                            ─────────
```

FIG. 36

```
         OPTIMUM PRICE PREDICTION

ITEM : 92345678         TERM : 90.10.01~90.12.31

REGULAR            DEAD            REST
     PRICE : $22.80    STOCK : 50      TIME : 2 HOURS

OPTIMUM DISCOUNT SUM :     $  4.80
   (MAXIMUM DISCOUNT SUM : $5.00)
           OPTIMUM PRICE :     $ 18
          PREDICTED SALE :       50
```

FIG. 41

ANALOGOLUS ITEM TABLE

| ITEM CODE | ANALOGOUS ITEM CODE |
|---|---|
| 1 1 1 1 1 1 1 2 | 1 1 1 1 1 1 1 1 |
| 1 1 1 1 1 1 1 3 | 1 1 1 1 1 1 1 1 |
|  |  |
| 1 2 3 4 5 6 7 8 | 1 1 1 1 1 1 1 1 |
| 1 2 3 4 5 6 7 9 | 1 1 1 1 1 1 1 1 |
| 2 1 1 1 1 1 1 1 | 2 3 2 3 4 4 4 4 |
| 2 1 1 1 1 1 1 2 | 2 3 2 3 4 4 4 4 |
|  |  |

FIG. 42

CLASSIFIED ITEM TABLE

| ITEM CODE | CLASSIFICATION CODE |
|---|---|
| 1 1 1 1 1 1 1 1 | 1 1 1 1 |
| 1 1 1 1 1 1 1 3 | 1 1 1 1 |
|  |  |
| 1 1 1 1 1 1 9 9 | 1 1 1 1 |
| 1 1 1 1 1 2 0 0 | 1 1 1 2 |
|  |  |
| 1 9 9 9 9 9 9 9 | 1 9 9 9 |
| 2 0 0 0 0 0 0 0 | 2 1 1 1 |
|  |  |

MERCHANDISE ANALYSIS SYSTEM WITH SALES DATA TABLE AND VARIOUS FUNCTIONS FOR PREDICTING THE SALE BY ITEM

BACKGROUND OF THE INVENTION

The present invention relates to a merchandise analysis system for predicting sales figures on the basis of the past actual sales data by item.

Price elasticity analysis in which a linear function is applied to the past actual data of price versus sale by item to predict parameters of the linear function for the item to thereby obtain the increasing rate of the sale by item to slight reduction of the price has a disadvantage in that poor approximation may occur to make it impossible to improve precision on the predicted value in the case of use of on a fixed function.

U.S. Pat. No. 4,843,546 issued to Yoshida et al. on Jun. 27, 1989 discloses a POS terminal adapted for merchandise names and unit prices of well-selling merchandise. U.S. Pat. No. 4,398,250 issued to Hosono on Aug. 9, 1983 discloses a cash register having a classified sales data storage area. U.S. Pat. No. 4,972,504 issued to Daniel, Jr. et al. discloses a market research system for obtaining retail data. U.S. Pat. No. 4,928,279 issued to Maroi on May 22, 1990 discloses a point of sales terminal.

SUMMARY OF THE INVENTION

An object of the present invention is to provide a merchandise analysis system for predicting the sale by item highly precisely in the case where the price of the item is set to a certain value.

Another object of the present invention is to provide a merchandise analysis system for giving the sale by item by selecting data corresponding to various correlation patterns existing in the relation between price and sale by item.

A further object of the present invention is to provide a merchandise analysis system by which precision on a predicted value of sale by item can be improved by using data decided correspondingly to various change patterns of price and sale in the case where the price of the item is set to a value.

A still further object of the present invention is to provide a merchandise analysis system by which an item predicted to bring large sales by reduction in price can be selected on the basis of various correlation patterns in the relation between price and sale by item of a plurality of items.

The foregoing objects of the present invention can be attained by providing a system for prediction of the sales of an item in the case where the price of the item is set to a value, the system comprising: a sales table; means for preliminarily providing a plurality of functions different from one another in the relation between the price of the item and the sale of the item; an analysis means for obtaining errors with respect to all retrieved data on the basis of the predicted sales data based on a selected function and the actual sales data to thereby obtain the minimum error with respect to all the functions and obtain function parameters to minimize the error; a table for registering the minimum error corresponding the function having the function parameters with respect to all the functions; means for selecting a function having the minimum error out of the functions stored in the table and for displaying the selected function; and means for obtaining the predicted sale on the basis of the selected function and the set price inputted correspondingly to the display.

According to the present invention, functions are successively selected from the function table. The standard deviation of errors is obtained on the basis of errors with respect to all the retrieved data obtained on the basis of the predicted sale based on the selected functions and the actual sale. The standard deviation of the minimum error with respect to all the functions stored in the function table and function parameters to minimize the error are obtained. A function having the minimum standard deviation of error is selected from the plurality of functions. The predicted sale is obtained on the basis of the function and the set price. Accordingly, the sale can be predicted by using the best-fitted function among the plurality of functions, so that precision on predicted value can be improved.

BRIEF DESCRIPTION OF THE DRAWINGS

FIG. 7 shows an example of the input scene in the first embodiment;

FIG. 8 shows an example of the input in the first embodiment;

FIG. 10 shows an example of the sales table in the first embodiment;

FIG. 11 shows an example of the function table having a plurality of functions in the first embodiment;

FIG. 12 shows an example of the calculation of function parameters in the first embodiment;

FIG. 13 shows an example of the dispersion measure table in the first embodiment;

FIG. 17 shows an example of the stock table in the second embodiment;

FIG. 22 shows an example of the price change table;

FIG. 27 shows an example of the table used for the weighing in the fourth embodiment;

FIG. 28 shows another example of the table used for the weighing in the fourth embodiment;

FIG. 31 shows an example of the input scene in the fifth embodiment;

FIG. 35 shows an example of the input scene in the sixth embodiment;

FIG. 36 shows an example of the output scene in the sixth embodiment;

FIG. 41 shows an example of the table used for the analogous data retrieval in the seventh embodiment;

FIG. 42 shows an example of the table used for the second analogous data retrieval in the seventh embodiment;

DESCRIPTION OF THE PREFERRED EMBODIMENTS

Embodiments of the present invention will be described hereunder with reference to the drawings.

Figure 1:
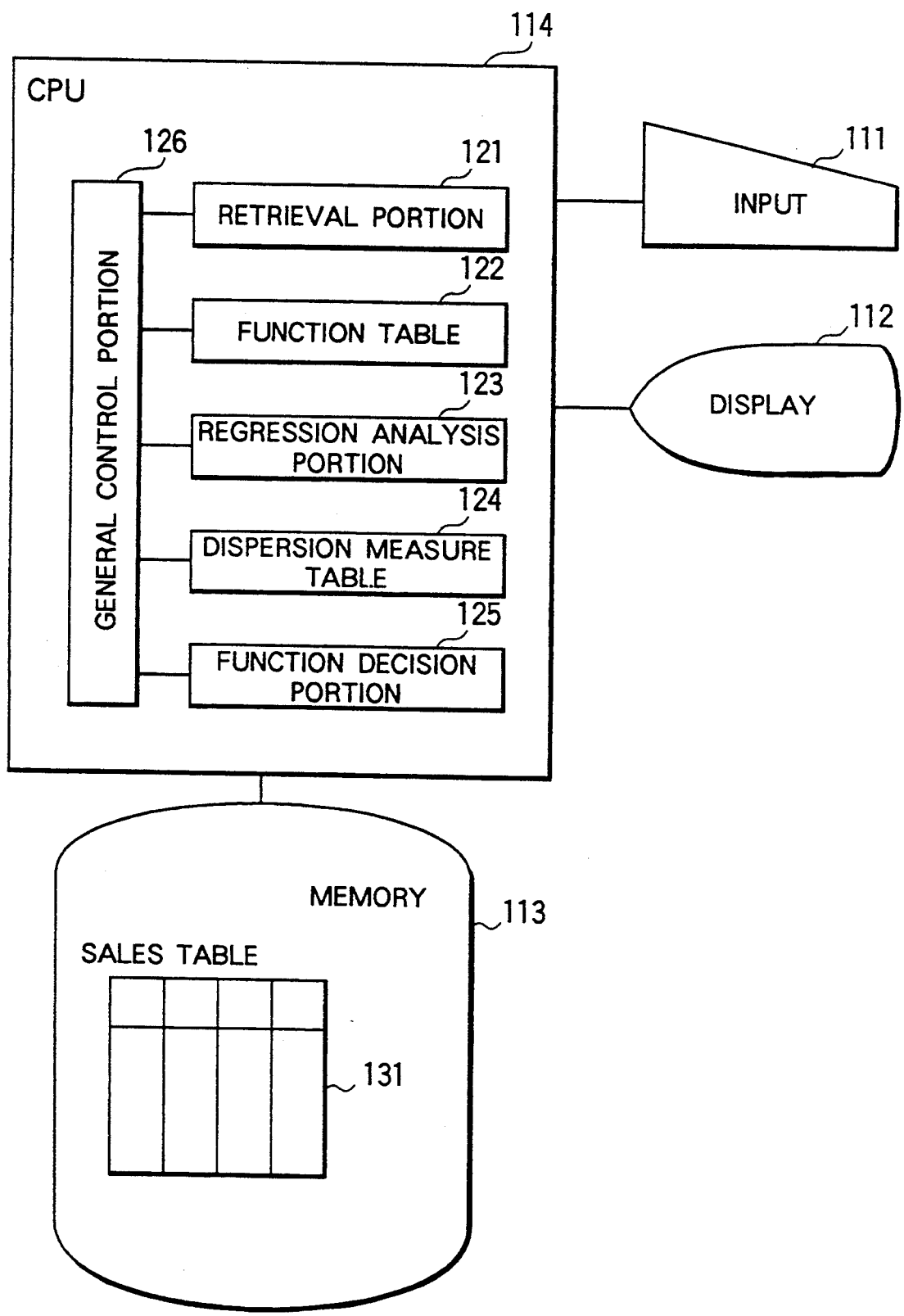
FIG. 1 is a constituent diagram of a system as a first embodiment of the present invention.
Figure 2:
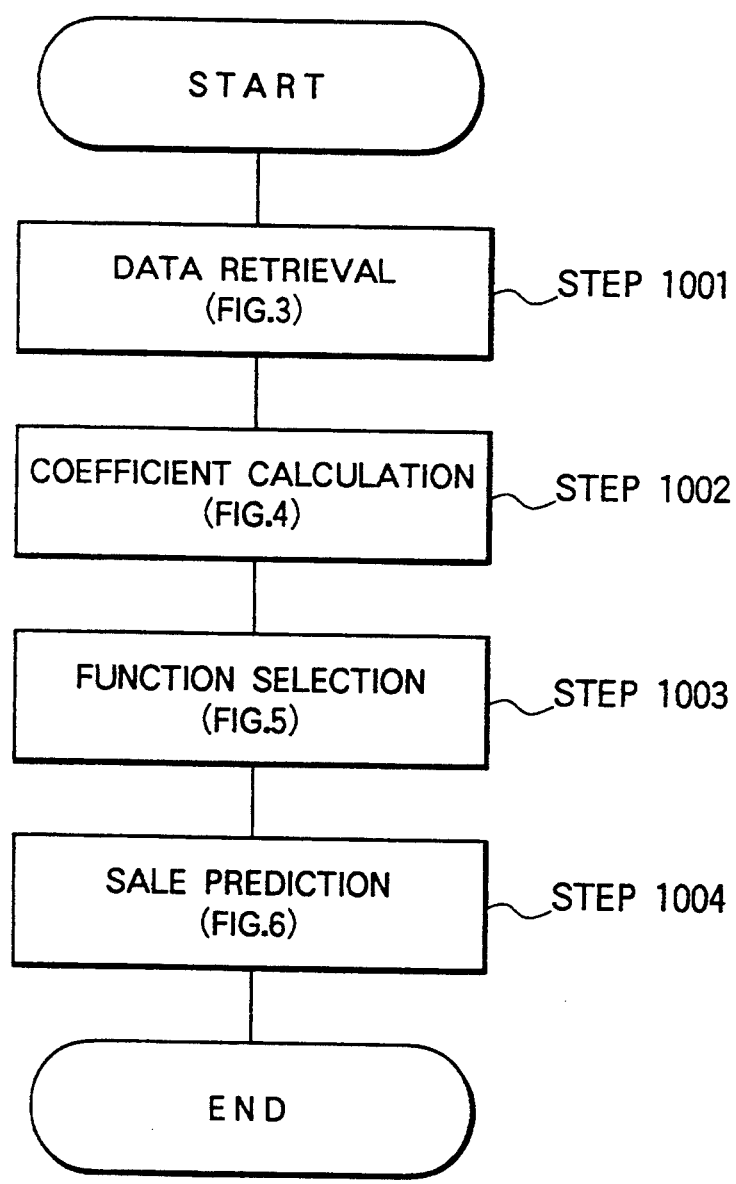
FIG. 2 is a schematic flow chart showing the operation of the system as the first embodiment of the present invention.
Figure 3:
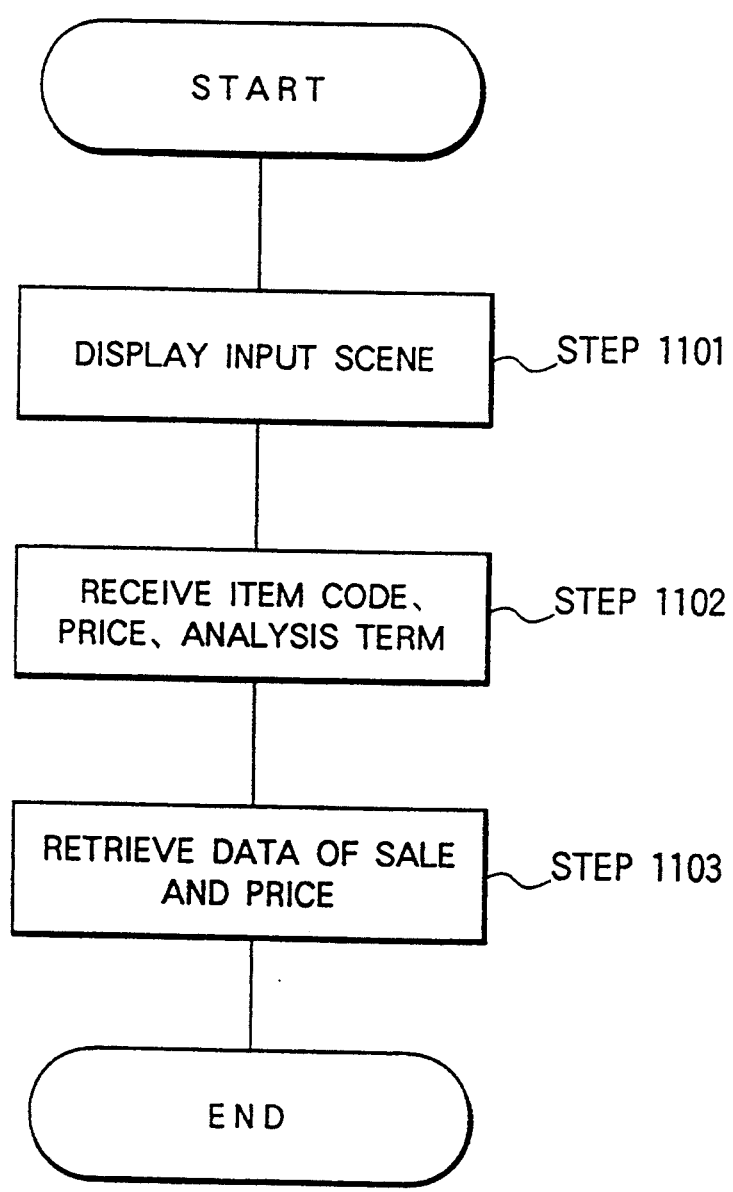
FIG. 3 is a detailed flow chart of the data retrieval portion depicted in FIG. 2.
Figure 4:
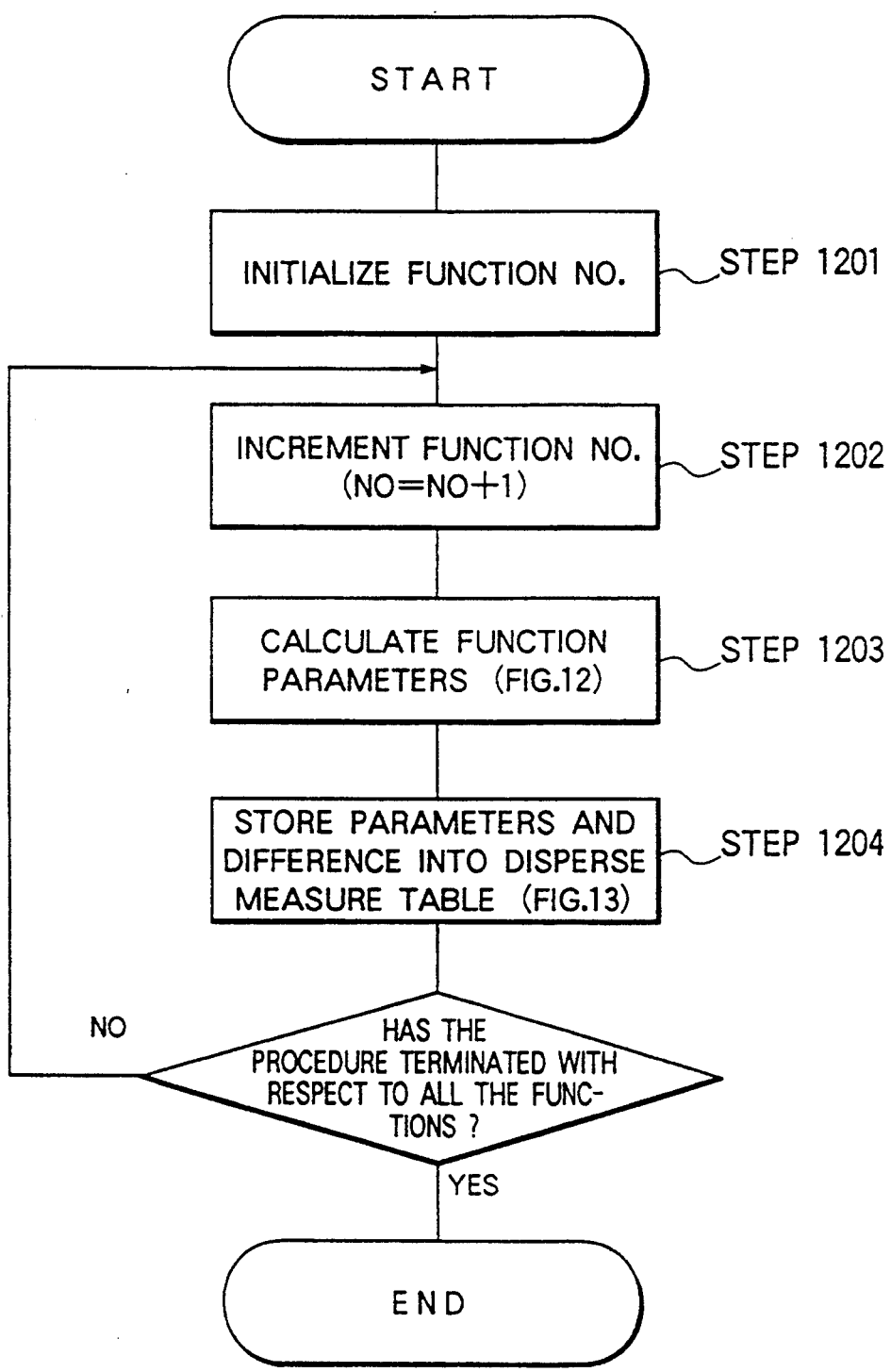
FIG. 4 is a detailed flow chart of the coefficient decision portion depicted in FIG. 2.
Figure 5:
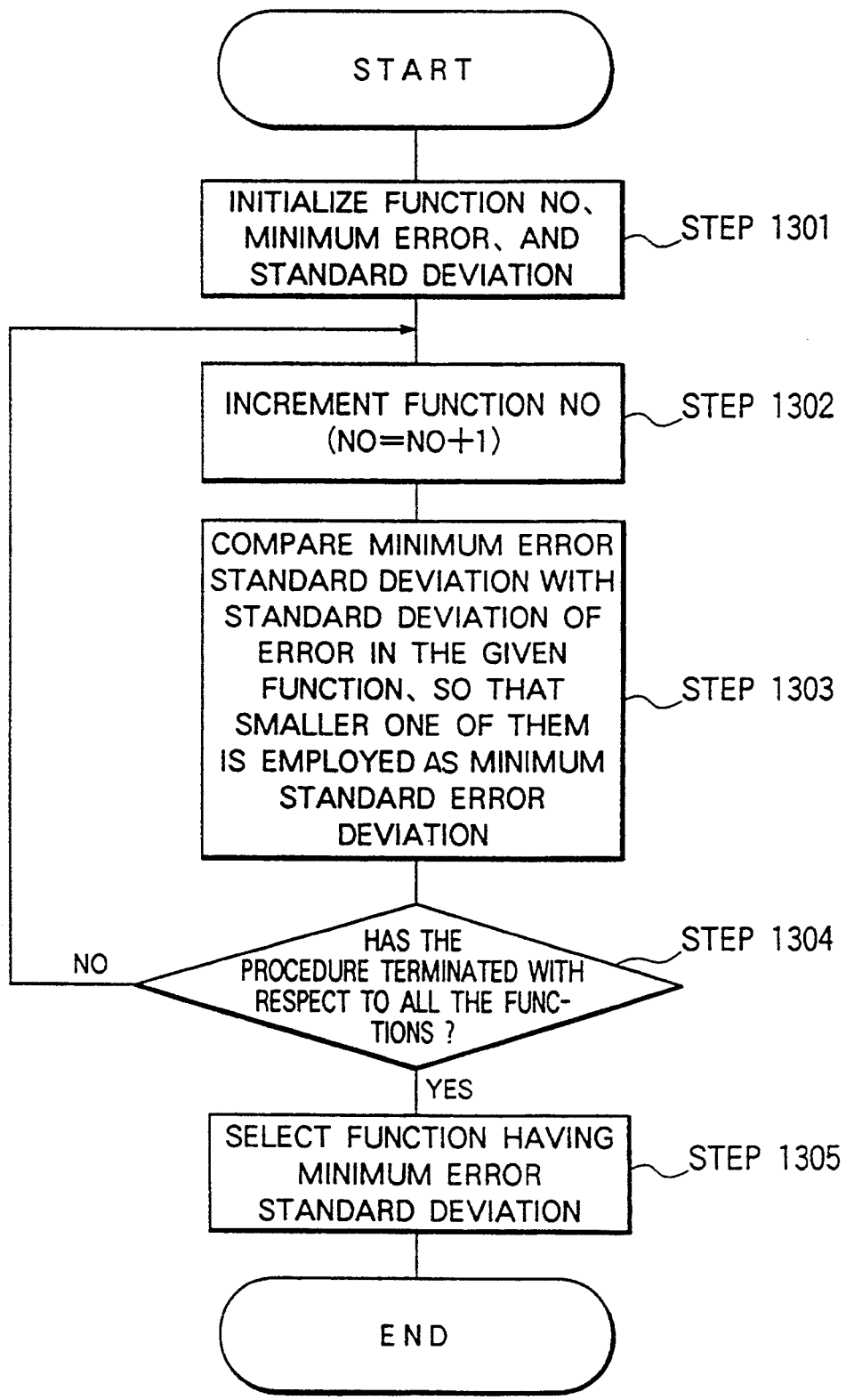
FIG. 5 shows an example of selection in the function selection portion depicted in FIG. 2.
Figure 6:
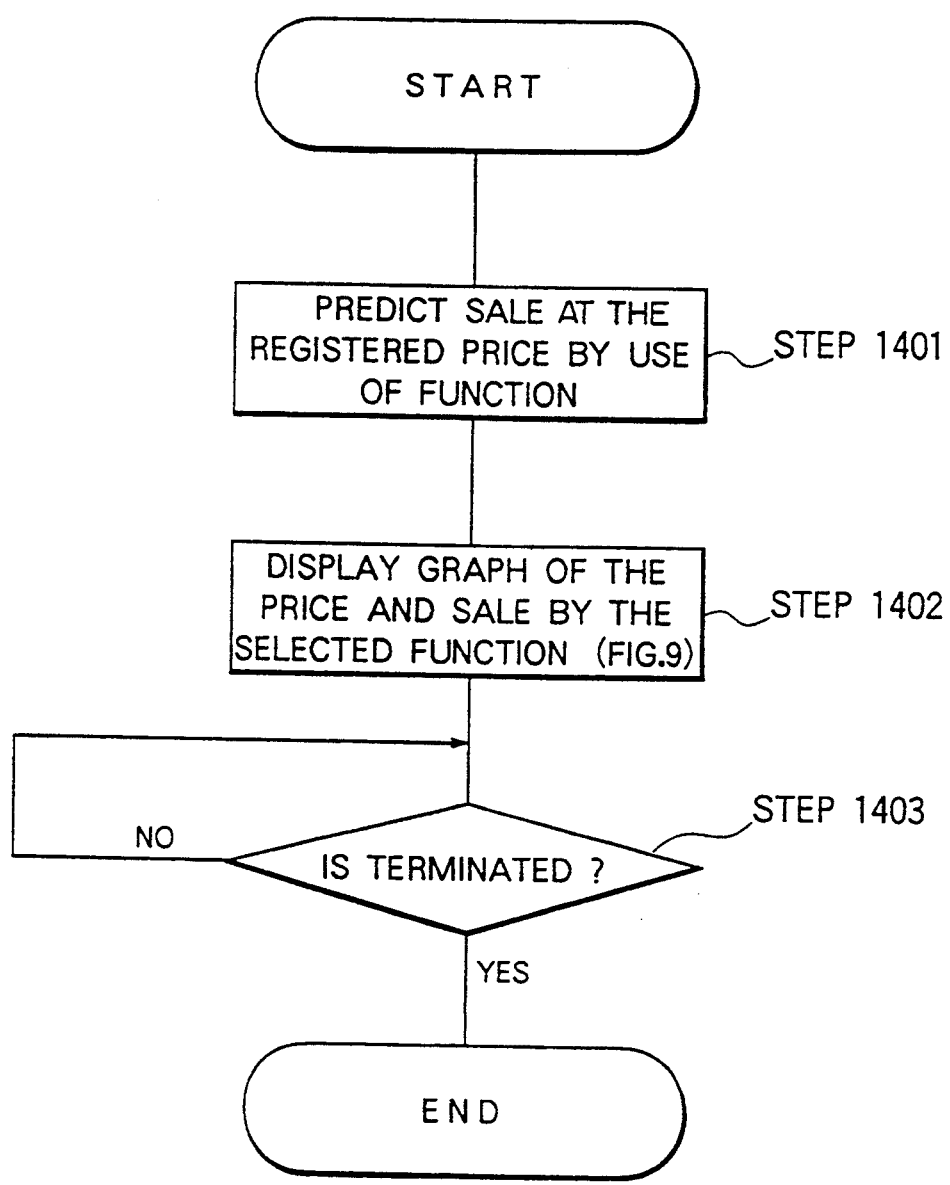
FIG. 6. is a detailed flow chart of the sale prediction portion depicted in Fig, 2.
Figure 9:
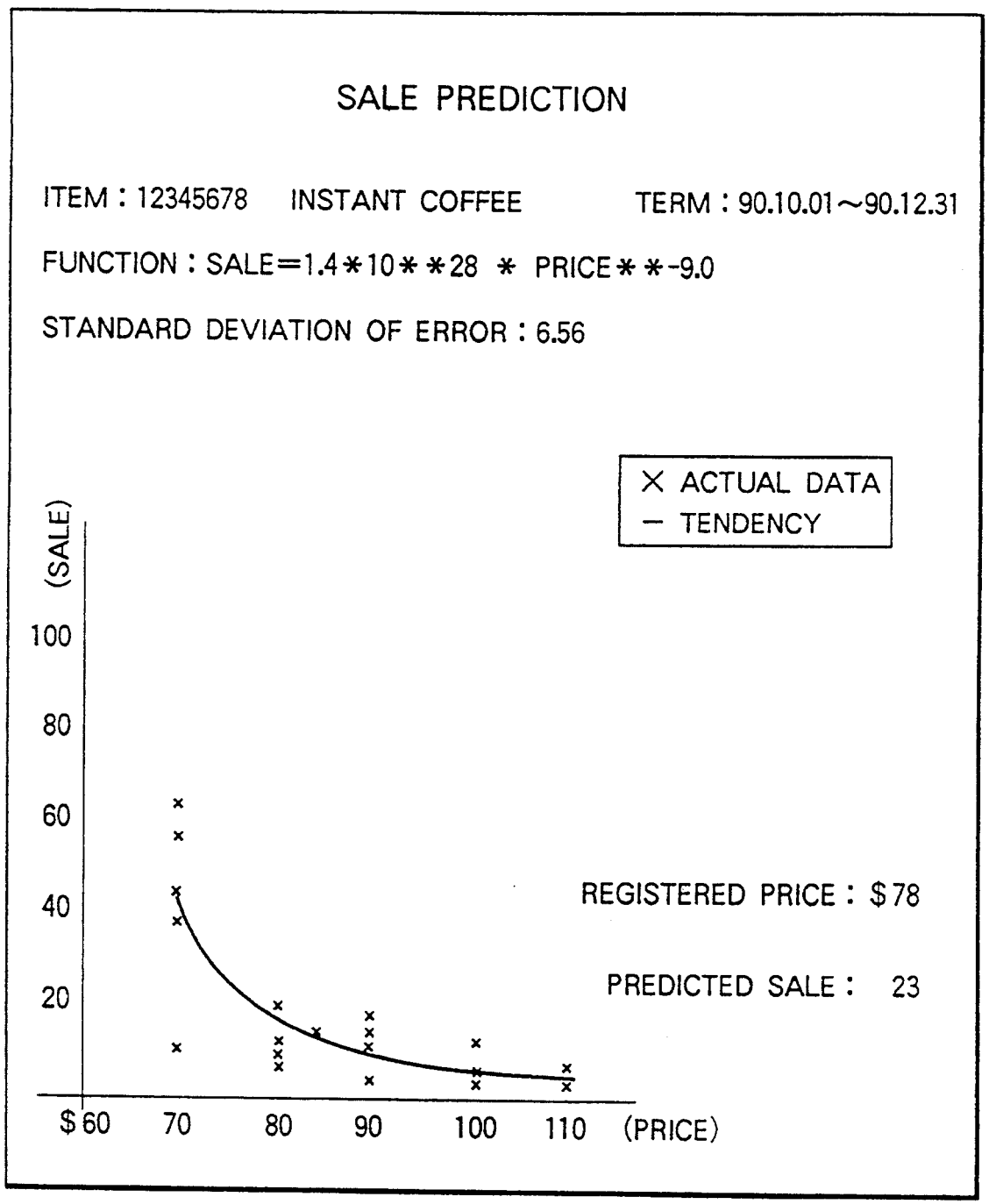
FIG. 9 shows an example of the output in the first embodiment.

FIGS. 1 to 13 show a first embodiment of the system for predicting the sale by item on the basis of the past actual sale by item under the assumption that the price of the item is set to an amount of money. FIG. 1 is a constituent diagram of this system, FIG. 2 is a schematic flow chart showing the operation of this system, FIGS. 3, 4 and 6 are detailed flow charts thereof, FIG. 5 shows an example of function selection, FIGS. 7 to 9 show examples of the output scene, FIG. 10 shows an example of the sales table in the memory, FIG. 11 shows an example of the function table containing a plurality of functions, FIG. 12 shows an example of calculation of function parameters, and FIG. 13 shows an example of the dispersion measure table used in the calculation of parameter.

As shown in FIG. 1, this system has an input device 111 such as a keyboard through which a user inputs information such as the code of an item to be analyzed, a display device 112 for displaying various input scenes, graphs of price versus sale by item and the like, a memory 113 (which is generally used as an external memory such as a floppy disk memory) for storing various kinds of data such as a sales table 131 in which the past actual price and actual sale by item are stored, and a CPU 114 for performing various kinds of processings with respect to the prediction of the sale by item on the assumption that the price of an item is set to an amount of money.

The CPU has a retrieval portion 121 for retrieving data from the sales table, a function table 122 for storing a plurality of defined functions, a regression analysis portion 123 for performing regression analysis for each of the functions to obtain function parameters to minimize the standard deviation of the difference (error) between the actual sale corresponding to the retrieved price and the predicted sale (a value obtained by substituting the price into a variable of the function) based on the function, a dispersion measure table 124 for storing the function parameters and the standard deviation of the error, a function decision portion 125 for deciding a function to minimize (the standard deviation of) the error from the dispersion measure table to predict the sale by item corresponding to the registered price by using the decided function and the function parameters, and a general control portion 126 for generally controlling this system. In this embodiment, the function table 122 and the dispersion measure table 124 are stored in an internal memory of the CPU. In this specification, the difference between the predicted sale based on the function and the actual sale is called "error".

The operation of this system will be described in brief with reference to FIG. 2 before it will be described in detail with reference to FIGS. 3 through 8.

(Step 1001): Data Retrieval

Data corresponding to an item to be subjected to prediction are retrieved from the sales table 131 containing sales data, such as past actual price, sale and the like, classified by item, on the basis of the item to be subjected to prediction and price information pertaining to the item. The detailed flow thereof is shown in FIG. 3.

(Step 1002): Coefficient Calculation

Respective coefficients for all functions registered in a function registration portion are calculated on the basis of the retrieved data. The detailed flow thereof is shown in FIG. 4.

(Step 1003): Function Selection

An optimum function is selected from the functions respectively having decided coefficients. A specific example of the function selection is shown in FIG. 5.

(Step 1004): Sale Prediction

The sale is predicted by using the selected function and outputted. The detailed flow thereof is shown in FIG. 6.

The detailed flow of the data retrieval in the step 1001 in FIG. 2 will be described by using steps 1101 to 1103 of FIG. 3.

(Step 1101)

When the system is started, an input scene as shown in FIG. 7 is displayed on the display device 112. At this time, a user inputs the code of an item to be subjected to sale prediction, the registered price thereof and the past term of the actual sale corresponding to the price used in this analysis, in the form as shown in FIG. 8.
(Step 1102)
The CPU 114 receives the code of the item to be subjected to sale prediction, the registered price thereof and the past term of the actual sale corresponding to the price used in the analysis, from the input device 111.
(Step 1103)
The sale and price of the registered item in the registered term 133 corresponding to the code of the registered item are retrieved from the sales table 131 in the memory as shown in FIG. 10, on the basis of the input data. In the case of FIG. 10, the price and sale data (surrounded by the solid line 133) of the registered item in the term of from Oct. 1, '90 to Dec. 31, '90, corresponding to the item code 12345678 inputted in FIG. 8 are picked up.

The detailed flow of coefficient decision for the function group in the step 1002 in FIG. 2 will be described by using steps 1201 to 1203 of FIG. 4.
(Step 1201)
Function number NO for identifying a function is initialized (NO=0). The function identified by the initialized function number NO=0 is nonexistent truly.
(Step 1202)
The function number is increased by 1 to the next function number NO (NO=NO+1).
(Step 1203)
A function identified by a corresponding function number NO is selected from the function table, so that function parameters to minimize the standard deviation of error are obtained on the basis of the actual sale corresponding to the retrieved price. An example of the function parameter decision method is shown in FIG. 12. This calculation example shows the calculation of function parameters in the case where the selected function is a linear function ax+b. In this example, the sum F of squared errors between the predicted sale and the actual sale is partially differentiated by parameters a and b to obtain the values of a and b in the case where the partial differential equations take zero, to thereby obtain the value of a and b to minimize the sum F of squared errors.
(Step 1204)
The function parameters thus calculated and the dispersion measure $$\frac{\sqrt{F}}{n+1}$$

are stored in the dispersion measure table 124. An example of the dispersion measure table is shown in FIG. 13. In the case of FIG. 13, function parameters a and b for a linear function are −0.1 and 100.0, respectively, so that the standard deviation of error set as the dispersion measure is 14.0. Like this, function parameters a and b for an exponential function are 1.4*10**28 and −9.0, respectively, so that the standard deviation of error is 9.6. In this expression 1.4*10**28, "*" represents multiplication, that is, "×", and "**" represents exponent. Accordingly, this expression 1.4*10**28 means 1.4×1028.
(Step 1205)
A judgment is made as to whether the aforementioned procedure is terminated with respect to the all functions in the function table 122. When the procedure is not yet terminated, the situation of the routine goes back to the step 1202. When the procedure is terminated, the coefficient decision routine in the step 1002 is terminated.

The detailed flow of function selection in the step 1003 in FIG. 2 will be described by reference to FIG. 5.
(Step 1301)
The function number NO and the standard deviation of the minimum error (minimum error standard deviation) as the dispersion measure are initialized (NO=0, minimum error standard deviation=99999999).
(Step 1302)
The function number NO is increased by 1 to the next function number (NO=NO+1).
(Step 1303)
Comparing the minimum error standard deviation with the standard deviation of error in the given function, smaller one is employed as the minimum error standard deviation.
(Step 1304)
A judgment is made as to whether the aforementioned procedure is terminated with respect to all functions. When the procedure is not yet terminated, the situation of the routine goes back to the step 1302. When the procedure is terminated, the situation of the routine goes to step 1305.
(Step 1305)
The function having the minimum error (standard deviation) is employed as a function to be selected.

In this embodiment, the standard deviation of error is employed as the dispersion measure, so that a function to minimize the standard deviation of error is selected. In the case of FIG. 13, an exponential function (having function parameters a and b which are 1.4*10**28 and −9.0, respectively) being smaller in the standard deviation of error is selected. The minimum error standard deviation may be replaced by minimum error. This is because an optimum function can be selected when the magnitude of the dispersion measure is decided on the basis of the value of the given function.

The detailed flow of sale prediction in the step 1004 will be described with reference to FIG. 6.
(Step 1401)
The predicted sale by item is calculated by substituting the registered price inputted by the user, into the function and the function parameters selected in the step 1003 in FIG. 2.
(Step 1402)
As shown in FIG. 9, the actual sale by item corresponding to the past price and the selected function are expressed as a graph, so that the predicted sale by item corresponding to the registered price is displayed numerically. In the case of FIG. 9, the predicted sale by item is 23.
(Step 1403)
The termination is monitored so that the prediction is terminated in response to a termination input given by the user.

Although this embodiment has shown the case where a linear function and an exponential function are used as the plurality of functions as shown in FIG. 11, the present invention can be applied to the case where a cubic function and the like may be used. Although this embodiment has shown the case where all functions preliminarily defined are subjected to prediction to obtain respective errors to thereby decide a function to minimize the standard deviation of error, the present invention can be applied to the case where a function having the standard deviation of error which is not larger than a predetermined reference value may be selected without subjecting all functions to prediction. Although this embodiment has shown the case where the registered price is initially inputted, the present invention can be applied to the case where the timing of inputting of the registered price may be set suitably. For example, the actual sale by item corresponding to the past actual price may be displayed immediately after retrieval so that the user can observe the display of the past actual sale by item before the registered price is inputted to predict the sale by item corresponding to the registered price and display the predicted sale by item corresponding to the registered price and a predicted sale graph corresponding to the price simultaneously. Although this embodiment has shown the case where the sale by item is predicted on the basis of the actual sale by item corresponding to the past price of the registered item, the present invention can be applied to the case where, instead of the sale by item, the sale per 1000 customers (hereinafter called "PI") may be predicted on the basis of the actual sale per 1000 customers ("PI") for the registered price. In this case, the same prediction procedure as described above can be applied.

Figure 14:
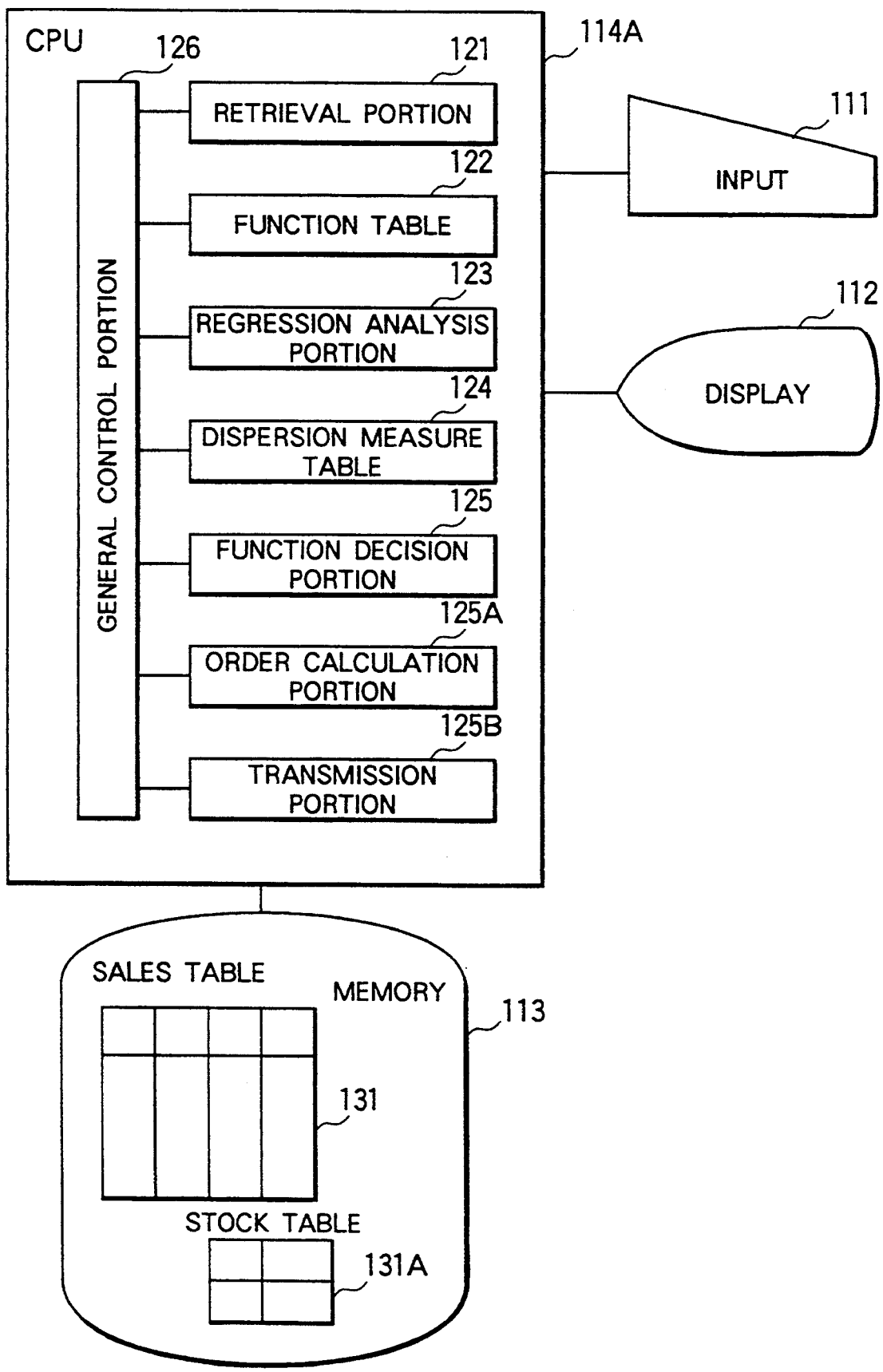
FIG. 14 is a constituent diagram of a system as a second embodiment of the present invention.
Figure 15:
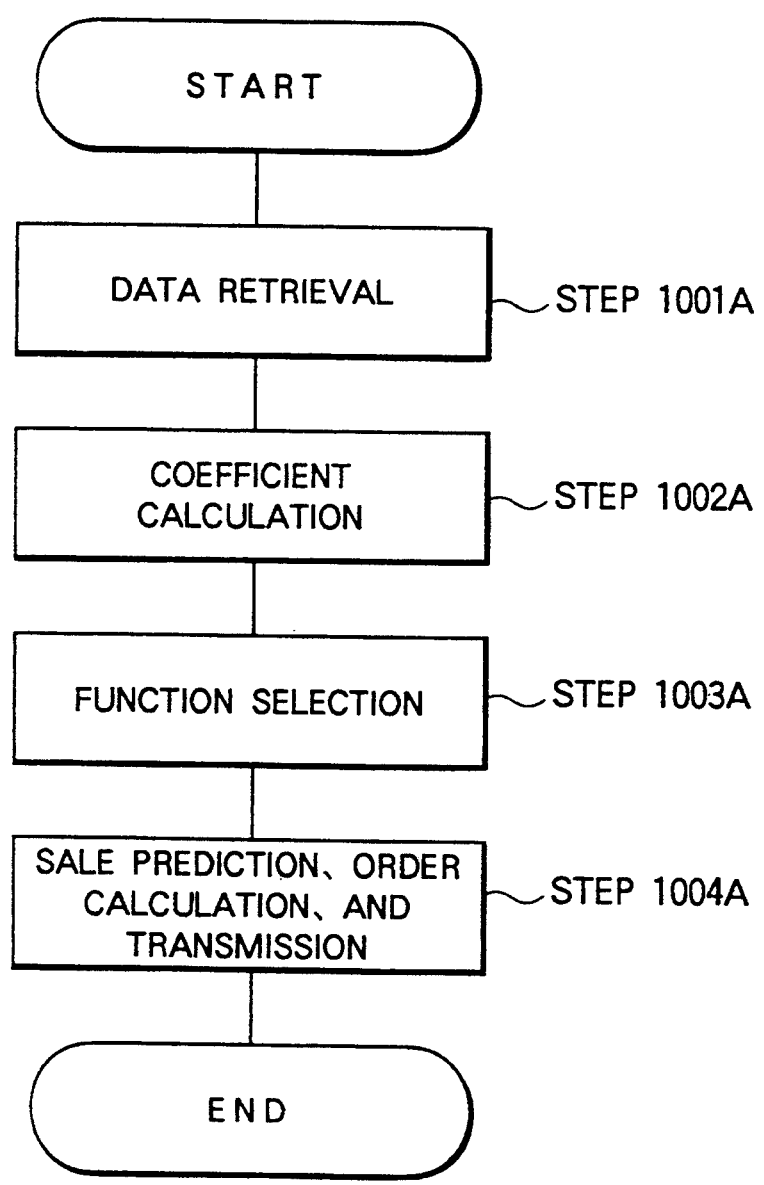
FIG. 15 is schematic flow chart showing the operation of the system as the second embodiment of the present invention.
Figure 16:
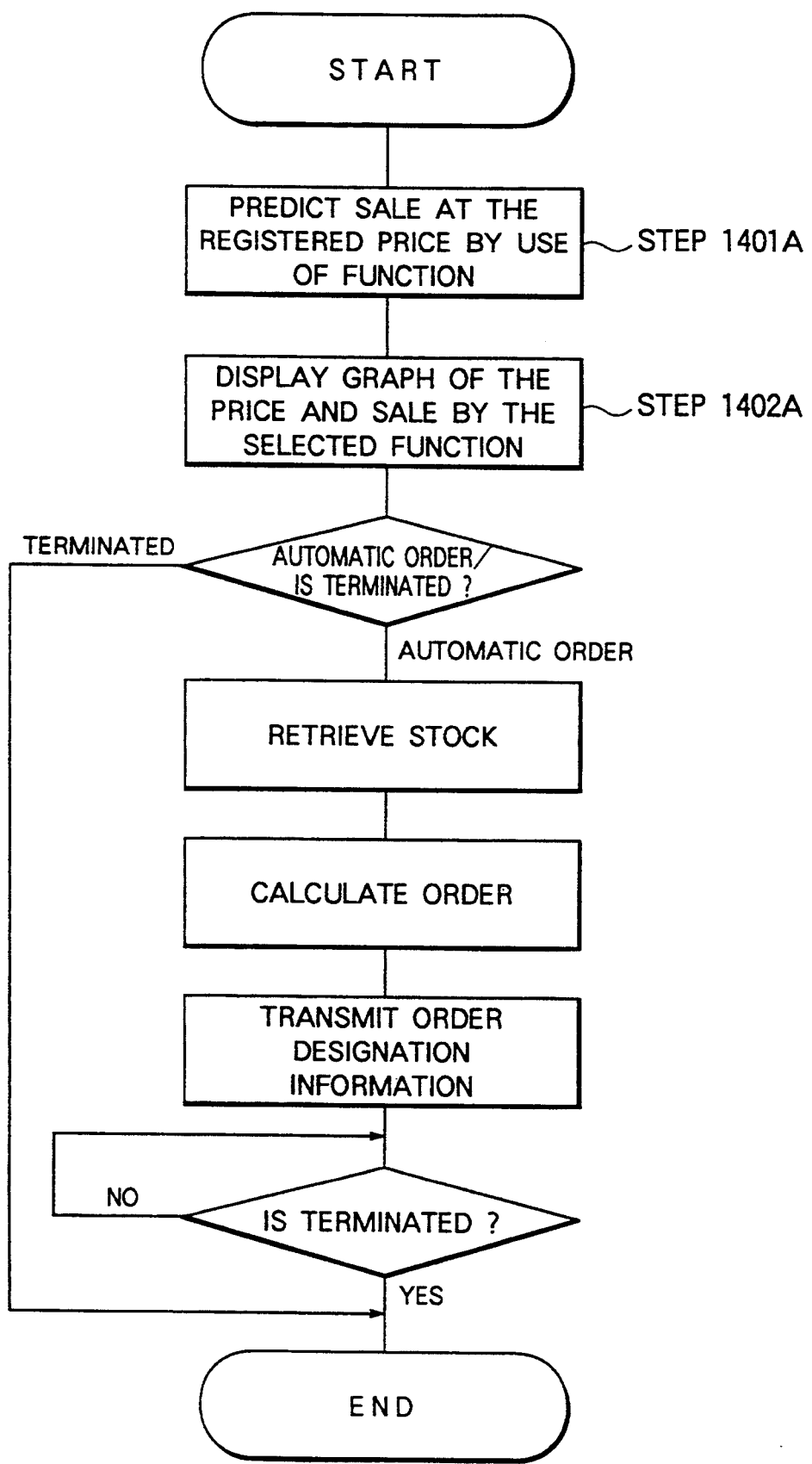
FIG. 16 is a detailed flow chart of the data retrieval/selection portion depicted in FIG. 15.

FIGS. 14 to 17 shows a second embodiment of the present invention. In the first embodiment, the predicted sale by item corresponding to the registered price is displayed numerically or graphically on the display device. To carry the embodiment a step further, the stock may be provided as a memory so that the ordering of the registered item by the difference between the predicted sale by item and the stock can be made automatically. A constituent diagram thereof is shown in FIG. 14, and a flow chart thereof is shown in FIG. 15. The main configuration in FIG. 14 is the same as that in FIG. 1, except that the system in FIG. 14 has an order calculation portion 125A for calculating an order on the basis of comparison between the stock of an item in the stock table 131A corresponding to the item code and the sale of the item, a transmission portion 125B for transmitting a signal expressing the calculated order from this system to a host computer or directly to an ordering source through communication line, and a stock stable 131A (FIG. 17) for storing the stock of items. In this flow chart, the sale prediction in the step 1004 in FIG. 2 is replaced by sale prediction & order calculation & transmission in the step 1004A. As shown in the detailed flow of FIG. 16, after the display of the sale in the step 1402A, an automatic order instruction is monitored (step 1403A). If termination is inputted, the routine is terminated. If an automatic order instruction is inputted, the stock of the registered item is retrieved from the stock table 131A (step 1404A) and then the order is calculated by subtracting the stock from the sale predicted in the step 1401A (step 1405A). The calculated order for the registered item, together with the item code and the ordered number, is transmitted to the host computer or the like through communication line (step 1406A). Here, termination is monitored (step 1407A) so that the routine is terminated if termination is inputted.

Figure 18:
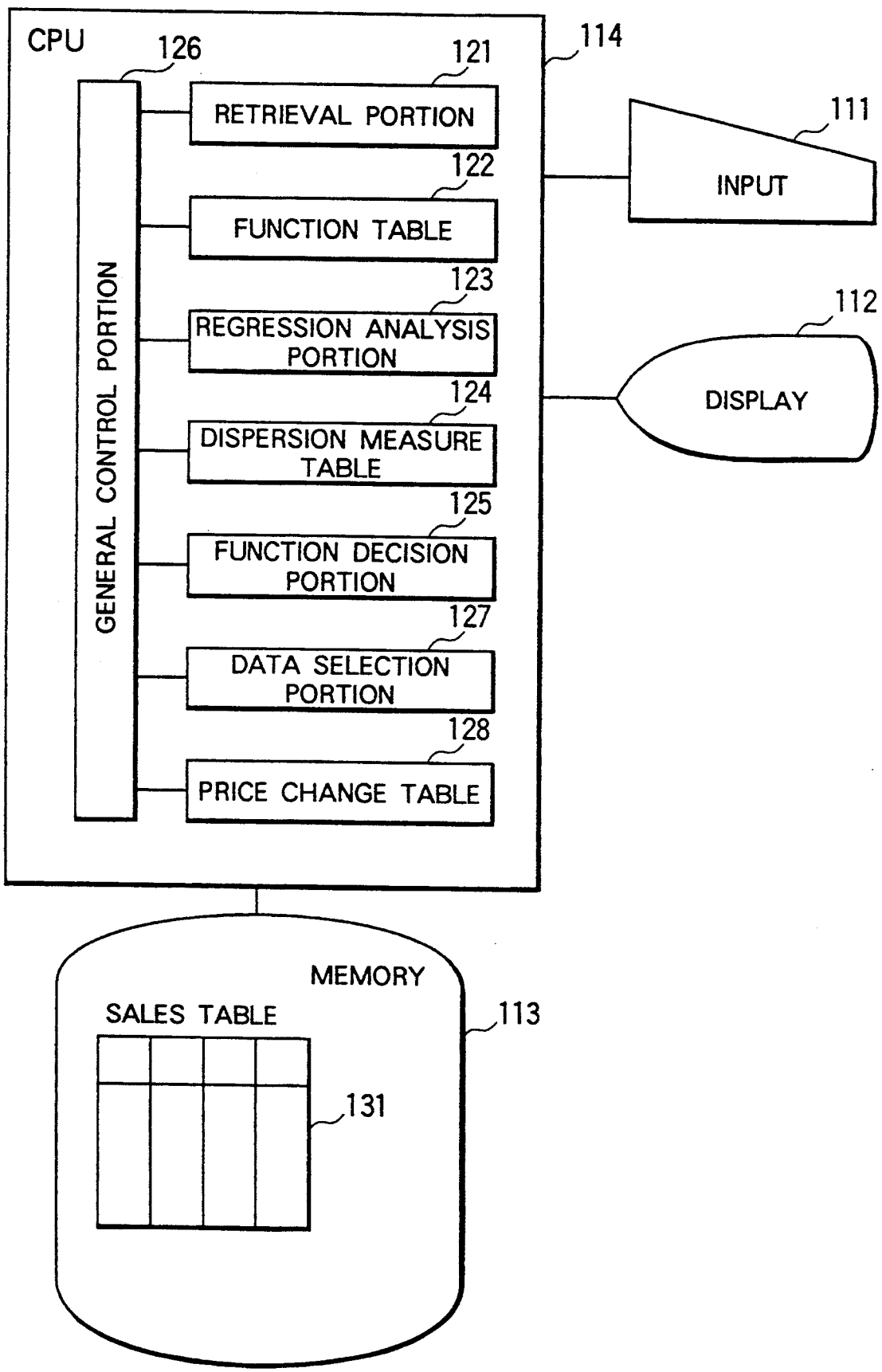
FIG. 18 is a constituent diagram of a system as a third embodiment of the present invention.
Figure 19:
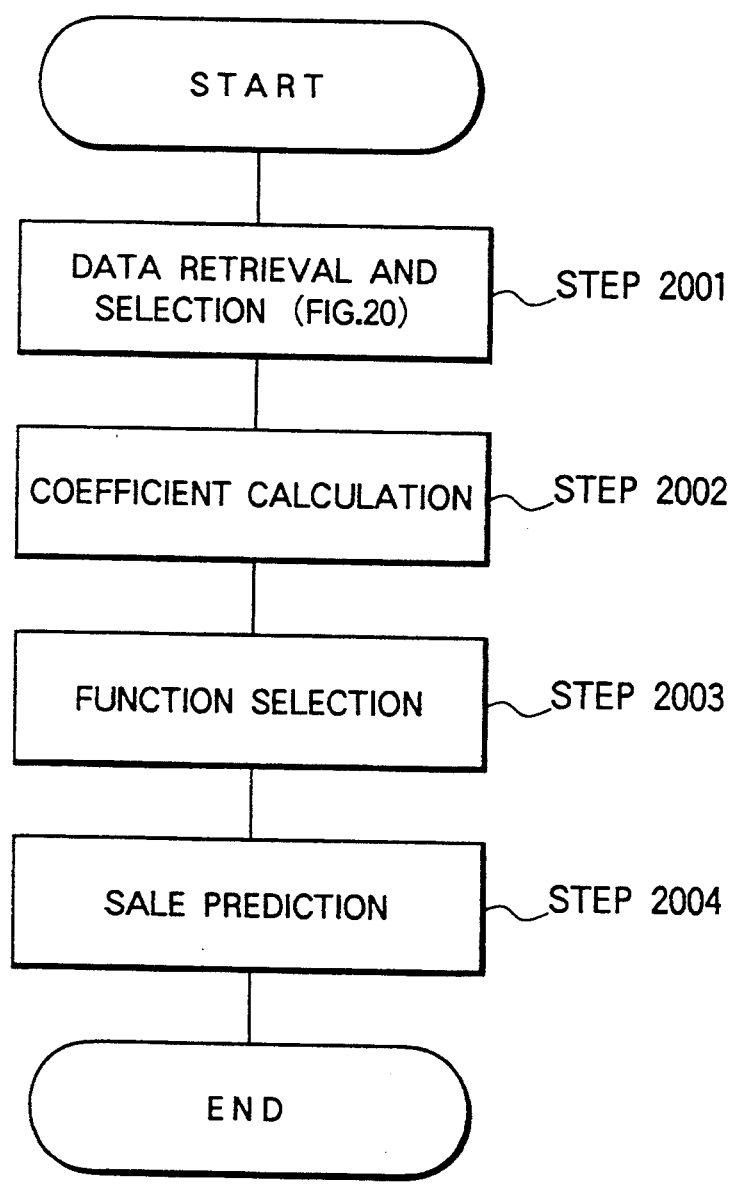
FIG. 19 is a schematic flow chart showing the operation of the system as the third embodiment of the present invention.
Figure 20:
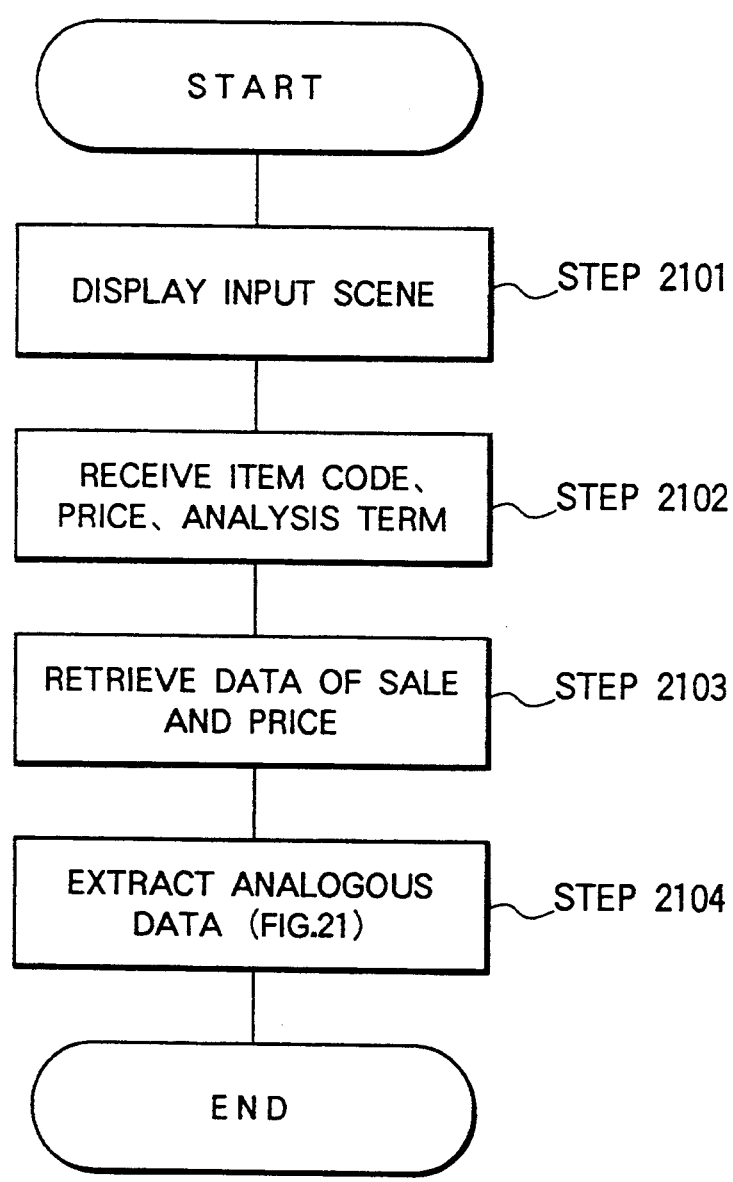
FIG. 20 is a detailed flow chart of the data retrieval/processing portion depicted in FIG. 19.
Figure 21:
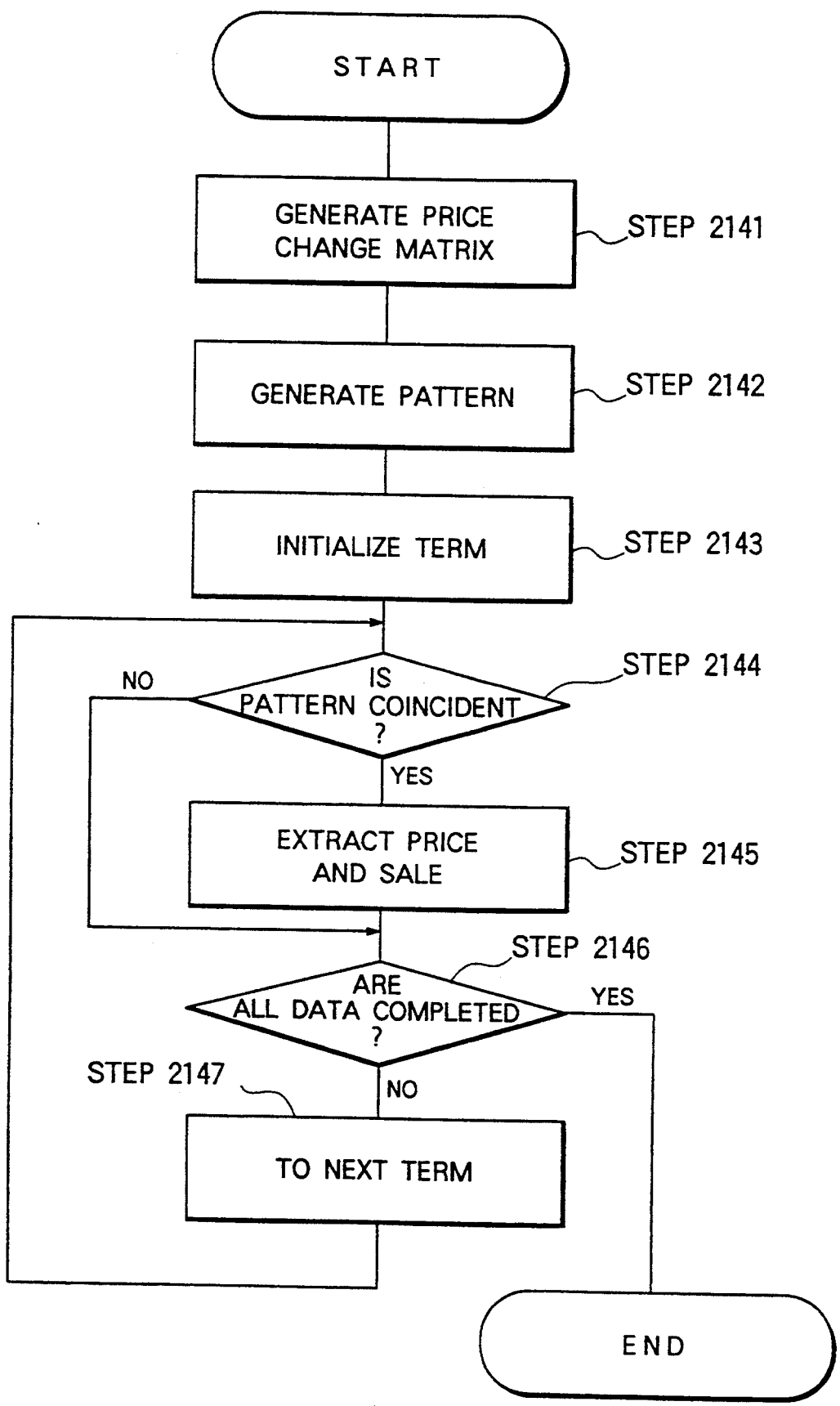
FIG. 21 is a flow chart of the analogous pattern extraction of FIG. 20.

FIGS. 18 to 22 shows a third embodiment of the present invention in which the sale corresponding to the price of an item set to an amount of money is predicted in the same manner as in the first embodiment after data used for the sale prediction are limited to the past actual sales data having a pattern analogous to the predicted price change pattern. This is an example of prediction based on the consideration that there is a difference between the sale in the case where a high price is reduced today and the sale in the case where a price is continued for several days though the average price in the former case may be equal to that in the latter case. The past actual sale is selected on the basis of a judgment as to whether the past price change pattern for discrimination among the three tendencies, namely, upward tendency, downward tendency and constant tendency of the present price compared with the past price (for example, the previous day's price) is analogous to the price change pattern to be predicted at this time. The sale is predicted by using the selected actual sale. FIG. 18 is a constituent diagram showing the configuration of the system as the third embodiment of the present invention, FIG. 19 is a flow chart showing the operation of the system, FIG. 20 is a detailed flow chart of the data retrieval/selection, FIG. 21 is a flow chart of the analogous pattern extraction, and FIG. 22 shows an example of the price change table.

As shown in FIG. 18, the configuration of this system is formed by adding to the configuration of the first embodiment in FIG. 1 a data selection portion 127 for retrieving data from the sales table 131 and for selecting data on the basis of a judgment as to whether the pattern thereof is analogous to the price change pattern to be predicted, and a price change table 128 used for the selection of data.

The operation of this system will be described hereunder with reference to FIG. 19.
(Step 2001): Data Retrieval/Selection The actual sales data of an item to be subjected to sale prediction are retrieved from the sales table 131 on the basis of registration of the item to be subjected to prediction and the price change to be subjected to prediction. The actual data used for prediction, that is, the actual data having a pattern analogous to the price change pattern, are selected from the retrieved data. The detailed flow thereof is shown in FIG. 20. The terminology "price change pattern" used herein means a change pattern between the registered price at a predetermined day and the price at the previous day. If the registered price and the previous day's price are respectively $78 and $110, the price change pattern has a downward tendency. If the registered price is equal to the previous day's price, the price change pattern has a constant tendency. If the registered price and the previous day's price are respectively $110 and $78, the price change pattern has an upward tendency.
(Step 2002): Coefficient Calculation Function coefficients for all functions registered in the function table 122 are calculated on the basis of the retrieved data.
(Step 2003): Function Selection An optimum function is selected out of the functions subjected to the coefficient calculation.
(Step 2004): Sale Prediction The sale is predicted by using the selected function and outputted.

The detailed flow of the data retrieval/selection in the step 2001 in FIG. 19 will be described with reference to FIG. 20.
(Step 2101)

When the system is started, an input scene as shown in FIG. 7 is displayed. At this time, a user inputs the code of an item to be analyzed, the term of the actual sale corresponding to the price used in this analysis, and the registered price.
(Step 2102)

The code of the item to be analyzed, the term of the actual sale corresponding to the price used in this analysis and the registered price thus inputted are received.
(Step 2103)

The sale and price of the registered item for the registered term corresponding to the code of the registered item are retrieved from the sales table on the basis of the input data.
(Step 2104)

The actual sales data used for prediction, that is, the actual sales data having a pattern analogous to the price change pattern, are extracted as analogous actual sales data from the retrieved actual sales data corresponding to the price for the registered term. An example of the analogous pattern extraction will be described hereunder.

The flow chart of the analogous pattern extraction will be described with reference to FIG. 21.
(Step 2141)

A price change table 128 in which the three values of 1, 0 and −1 are respectively given to the three tendencies, namely, upward tendency, constant tendency and downward tendency of the price of the retrieved item compared with the previous day's price thereof is generated. An example of the table thus generated is shown in FIG. 22.
(Step 2142)

The price change pattern exhibited by the registered price is picked up from the price change table 128. In the case of FIG. 22, a matrix [0, −1] on January 6 and 7 in the half-tone dot-meshed portion is picked up. In this case, January 7 is a price setting day, and January 6 is a day previous to the price setting day. In the case where the price setting day is out of the registered term, the price change pattern may be picked up on the basis of the registered price at the price setting day and the previous day's price.
(Step 2143)

To extract the actual sales data having a pattern equal to the price change pattern exhibited by the registered price, the term is initialized. In the case of FIG. 18, the initial term is set to the two days of January 1 and 2.
(Step 2144)

A judgment is made as to whether the price change pattern for the given term is equal to the price change pattern ([0, −1] in the case of FIG. 22) exhibited by the registered price.
(Step 2145)

When the former pattern is equal to the latter pattern, price and sale data for the term are extracted.
(Step 2146)

A judgment is made as to whether the extraction of the actual sales data in the all term is completed. When the extraction is completed, the analogous pattern extraction step 2104 is terminated.
(Step 2147)

When the extraction is not yet completed, the term is shifted to the next term (the next day in the case of FIG. 22 (for example, shifted by one day to January 2 and 3 from January 1 and 2) and then the situation of the routine goes back to the step 2144.

Although this embodiment has shown the case where the term of the price change pattern to be picked up is set to the term of a price setting day and a day previous to the price setting day (in the step 2143), the term of the pattern may be larger or may be set to one day (for example, the matrix column [−1] of January 7 as a price setting day in the price change table in FIG. 22 may be used as the pattern). Although this embodiment has shown the case where the matrix is determined on the basis of the upward and downward tendencies of the price change so simply that the magnitude of the price change is not considered, the matrix may be generated under the consideration of the increasing rate, the increasing amount of money, the decreasing rate and the decreasing amount of money. Although this embodiment has shown the case where matching check is performed by setting the matrix to select the analogous pattern, the present invention can be applied to the case where matching check may be performed without use of any matrix if the analogous pattern can be selected. Accordingly, the phenomenon that the sale is expanded in the case where a price is determined by reduction though the sale is reduced in the case where the same price is determined by rise and the phenomenon that the sale is not so expanded in the case where the price is reduced gradually though the sale is sufficiently expanded in the case where the price is reduced suddenly can be considered, so that well-fitted sale prediction can be made.

Figure 23:
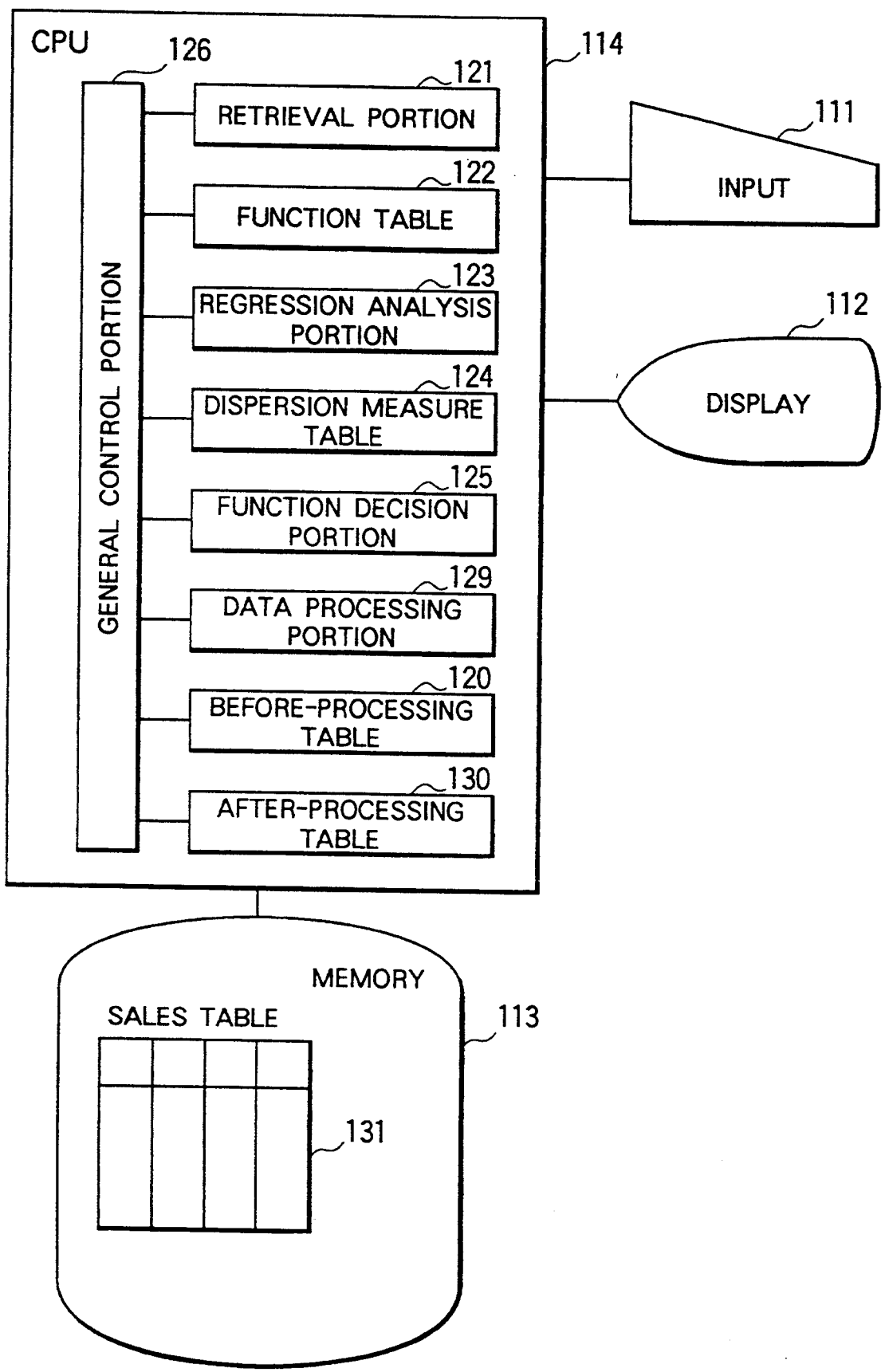
FIG. 23 is a constituent diagram of a system as a fourth embodiment of the present invention.
Figure 24:
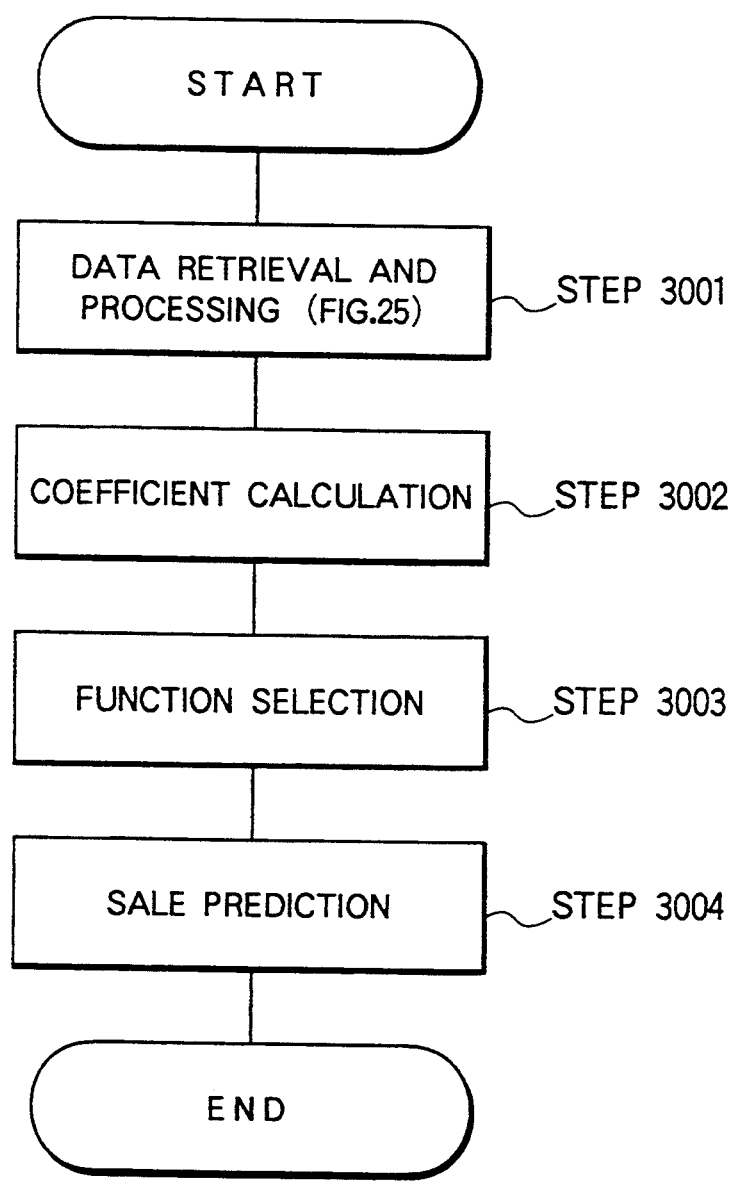
FIG. 24 is a schematic flow chart showing the operation of the system as the fourth embodiment of the present invention.
Figure 25:
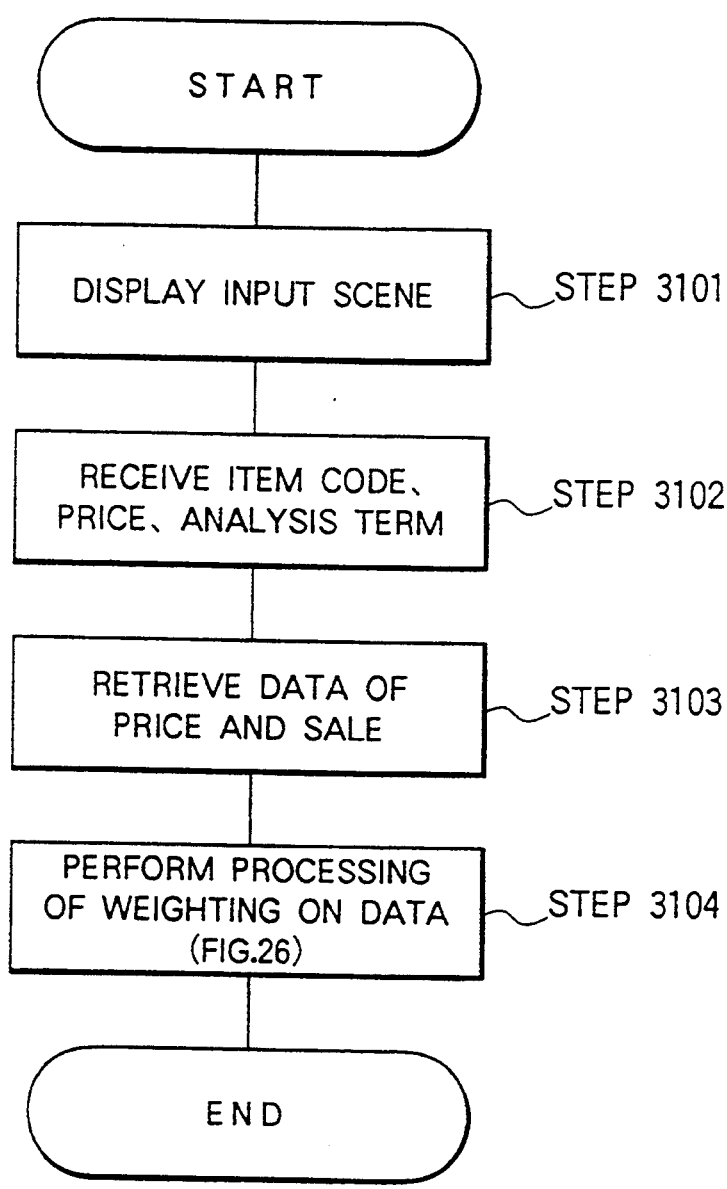
FIG. 25 is a detailed flow chart of the data retrieval/processing portion depicted in FIG. 24.
Figure 26:
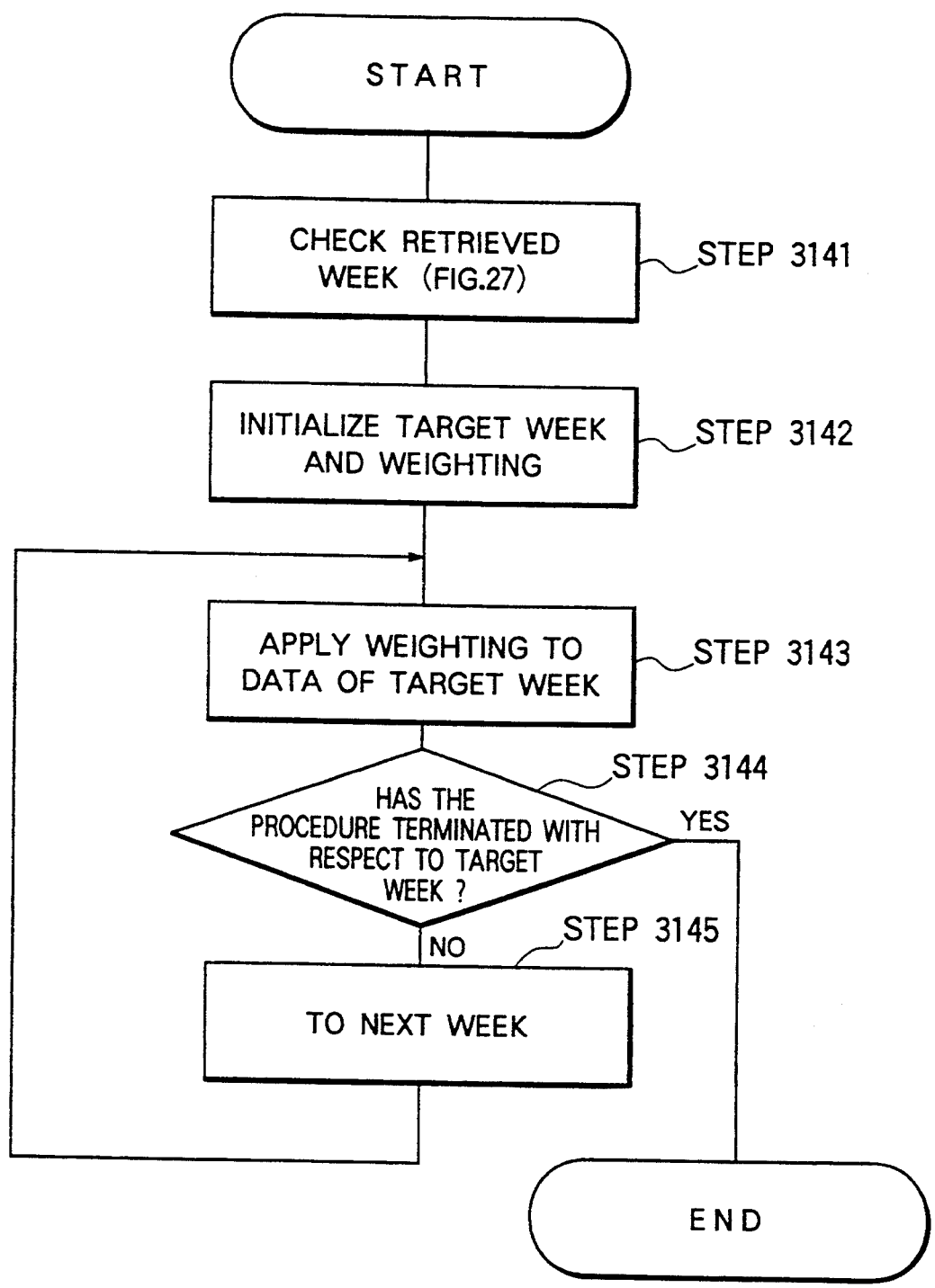
FIG. 26 is a flow chart of the weighing in the fourth embodiment.

FIGS. 23 to 28 show a fourth embodiment of the present invention in which the sale is predicted after weighing is applied to the actual sales data, for example, the proximate actual sales data, without simple sale prediction. FIG. 23 is a constituent diagram showing the configuration of the system, FIG. 24 is a flow chart showing the operation of the system, FIG. 25 is a flow chart of the data retrieval/processing, FIG. 26 is a flow chart showing the weighing, and FIGS. 27 and 28 show examples of the table used for the weighing.

As shown in FIG. 23, the configuration of this system is formed by adding, to the configuration of the embodiment in FIG. 1, a data processing portion 129 for weighing data retrieved from the sales table 131, a before-processing table 120 used for the weighing of data, and an after-processing table 130.

The operation of this system will be described hereunder with reference to FIG. 24.
(Step 3001): Data Retrieval/Processing Data of an item to be subjected to sale prediction are retrieved from the sales table 131 on the basis of the item code and the term set by a user. Proximate weighing is applied to the retrieved data. The detailed flow thereof is shown in FIG. 25.
(Step 3002): Coefficient Calculation Function coefficients for all functions registered in the function table 122 are calculated on the basis of the retrieved data.
(Step 3003): Function Selection An optimum function is selected out of the functions subjected to the coefficient calculation.
(Step 3004): Sale Prediction The sale is predicted by using the selected function and outputted.

The detailed flow of the data retrieval/processing in the step 3001 of FIG. 24 will be described with reference to FIG. 25.
(Step 3101)

When the system is started, an input scene as shown in FIG. 7 is displayed. At this time, a user inputs the code of an item to be analyzed and the term of the actual sale corresponding to the price used in this analysis.
(Step 3102)

The code of the item to be analyzed and the term of the actual sale corresponding to the price used in this analysis are received.

(Step 3103)

Sale and price data of the registered item for the registered term corresponding to the code of the registered item are retrieved from the sales table 131.

(Step 3104)

The data are processed according to a predetermined weighing method on the basis of the retrieved price and actual sale data. An example of the weighing will be described hereunder.

Although this embodiment has shown the case where the weighing method is fixed, the present invention can be applied to the case where a plurality of weighing methods may be registered so that a method can be selected on the input scene by the user.

An example of the weighing in the step 3104 in FIG. 25 will be described with reference to FIG. 26.

(Step 3141)

The term (N weeks) of the retrieved data is checked. The retrieved data are numbered (week number NO) in order of starting from the proximate week, so that a before-processing table 120 is generated. In the case of FIG. 27, the table has 6 weeks' data.

(Step 3142)

A target week and a weight are initialized (NO=1, weight=N). In the case of FIG. 27, the weight N is 6.

(Step 3143)

Data in the target week are weighted (data are generated so that the number of price and sale data by date in the week is increased by multiplying by the weighing).

(Step 3144)

A judgment is made as to whether there is any target week.

(Step 3145)

When there is any target week, the week is shifted to the next week, the weight is set to −1 and then the situation of the routine goes back to the step 3143.

An example of the weighted data and the after-processing table 130 is shown in FIG. 28. Data in the proximate week of NO=1 are increased by six times (the one-day's data is counted as six-days' data).

Although this embodiment has shown the case where the weight is changed by every week, the present invention can be applied to the case where the weight may be changed by every day. Although this embodiment has shown the case where the number of data is increased to an integral multiple by the weighing, the present invention can be applied to the case where a decimal may be used. Although this embodiment has shown the case where the weight is changed evenly, the present invention can be applied the to case where the weight may be changed so unevenly that proximate data are weighted extremely. That is, other weighing methods may be considered. Accordingly, the proximate data can be considered more sufficiently than the past data, so that well-fitted sale prediction can be made. Without application of weighing to the proximate data, this embodiment may be combined with the third embodiment so that weighing can be applied to data having an analogous pattern. That is, two-fold weighing is applied to data of the same change pattern but no weighing is applied to the other data so that the data can be used directly. Accordingly, sale prediction corresponding to the analogous price change pattern can be made, so that well-fitted sale prediction can be made.

Figure 29:
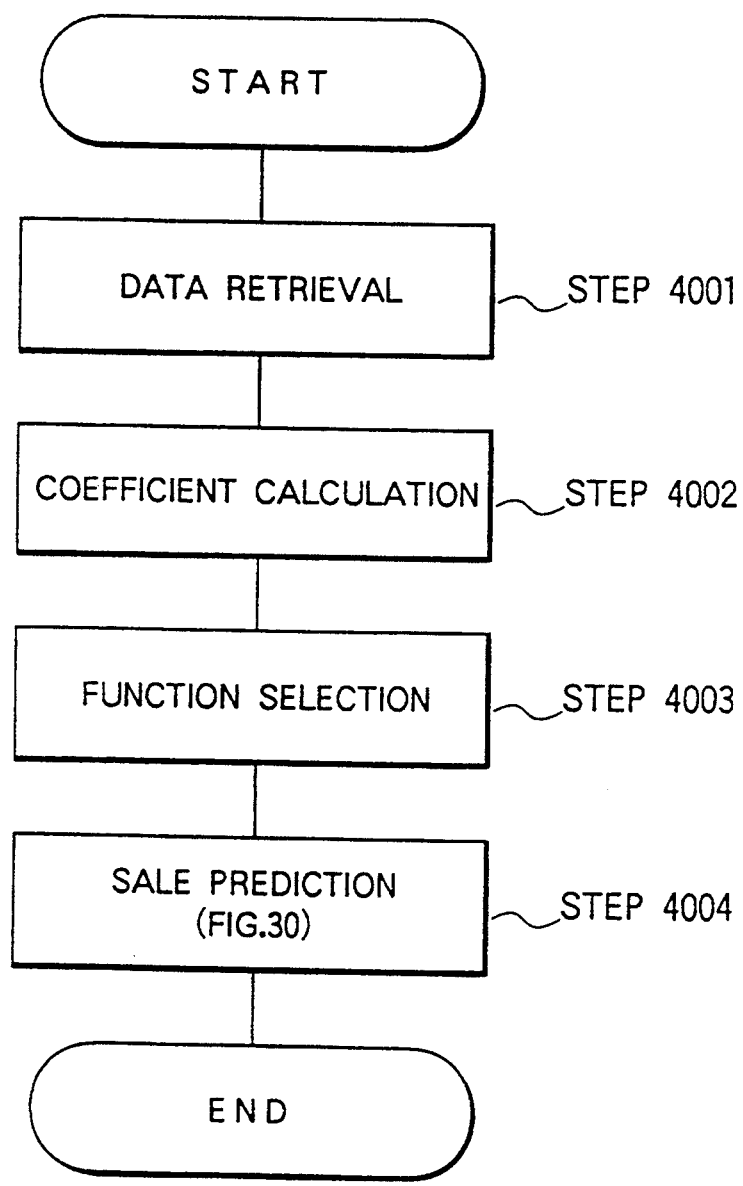
FIG. 29 is a schematic flow chart showing the operation of a system as a fifth embodiment of the present invention.
Figure 30:
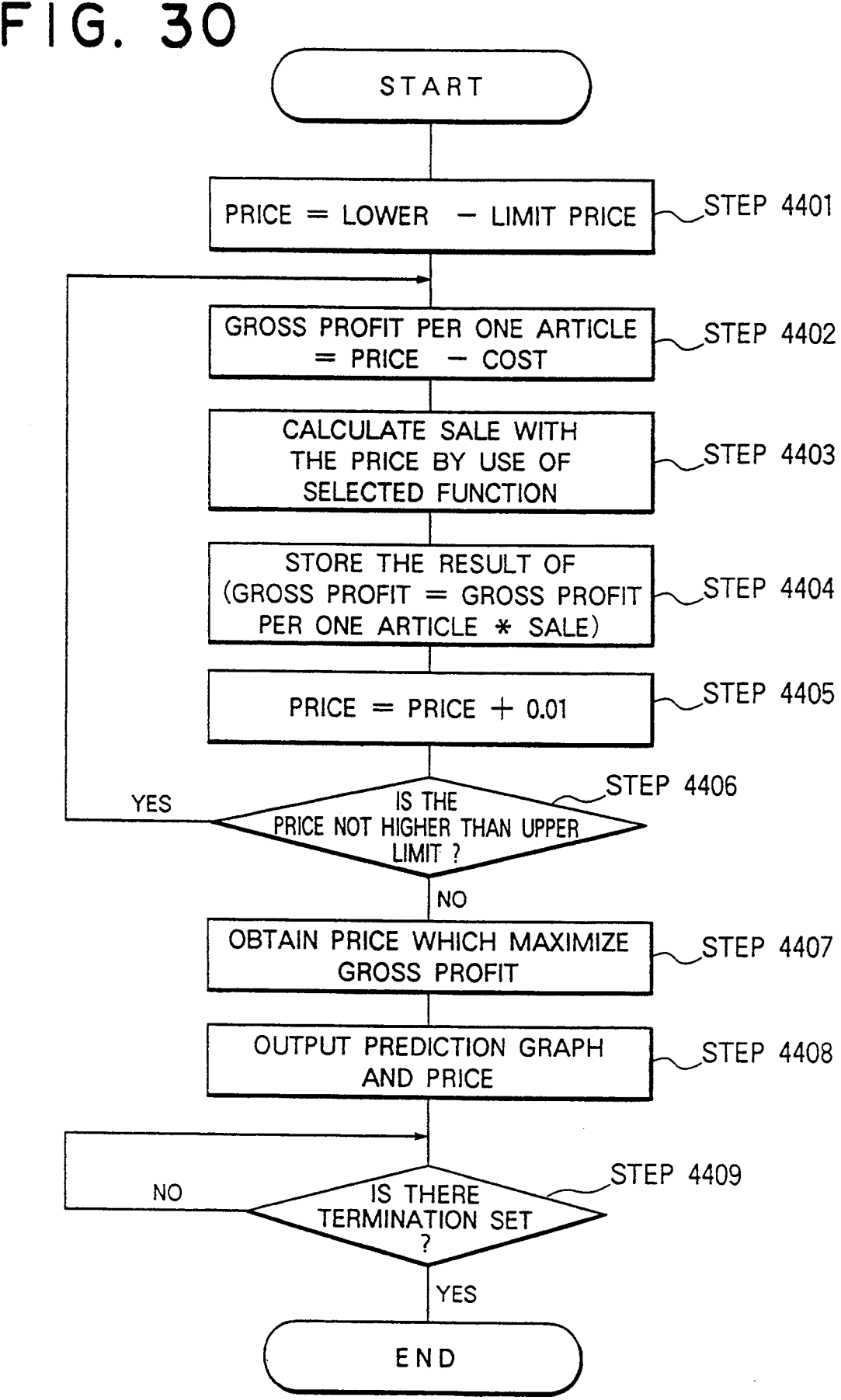
FIG. 30 is a detailed flow chart of the sale prediction portion depicted in FIG. 29.
Figure 32:
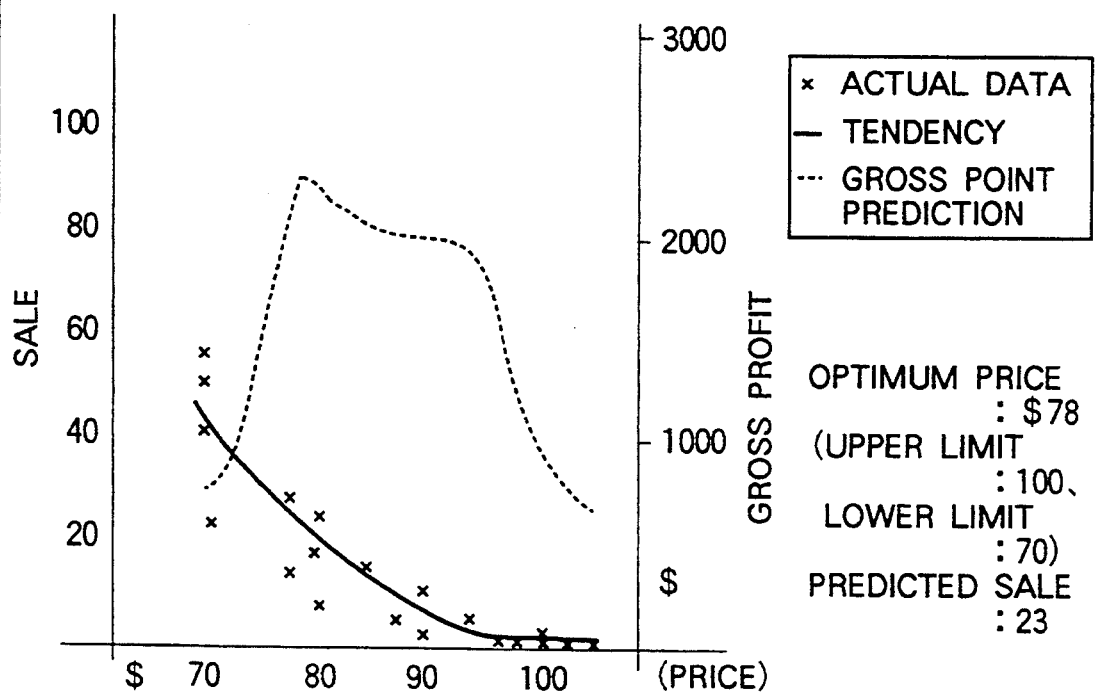
FIG. 32 shows an example of the output scene in the fifth embodiment.

FIGS. 29 to 32 show a fifth embodiment of the present invention in which not only the relation between sale and price is predicted but an optimum price in the future is proposed on the prediction of price and sale. FIG. 29 is a flow chart showing the operation of this system, FIG. 30 is a detailed flow chart of the sale prediction, and FIGS. 31 and 32 show examples of the scene.

The operation of this system will be described hereunder with reference to FIG. 29.

(Step 4001): Data Retrieval

When the code of an item to be subjected to sale prediction, the allowable price change range (upper limit and lower limit) and the term of sales data used in analysis are registered as shown in FIG. 31, data related to the item to be subjected to sale prediction are retrieved from the memory having sales data such as price and sale by item on the basis of the registration.

(Step 4002): Coefficient Calculation

Function coefficients for all functions registered in the function table 122 are calculated on the basis of the retrieved data.

(Step 4003): Function Selection

An optimum function is selected out of the functions subjected to the coefficient calculation.

(Step 4004): Sale Prediction

A price to maximize the gross profit in the registered price change range is predicted by using the selected function. The detailed flow of the sale prediction will be described with reference to FIG. 30.

(Step 4401)

The registered lower-limit price is set to the price.

(Step 4402)

Gross profit per one article (=price−cost) corresponding to the selected price is calculated.

(Step 4403)

The sale corresponding to the selected price is predicted by using the selected function.

(Step 4404)

Gross profit (=profit per one article * sale) is calculated and stored in a predicted gross profit table having price, sale and gross profit data.

(Step 4405)

The price is increased by $0.10.

(Step 4406)

A judgment is made as to whether the price is not higher than the upper-limit price. When the price is not higher than the upper-limit price, the situation of the routine goes back to the step 4402.

(Step 4407)

The relation between price and sale to maximize the gross profit is examined on the basis of the predicted gross profit table.

(Step 4408)

The predicted price and sale data are added to the graph of the actual price and sale data, so that the relation between price and sale to maximize the gross profit is displayed as shown in FIG. 32.

(Step 4409)

Termination is monitored, so that the routine is terminated when termination is set. Although this embodiment has shown the case where the actual sales data are not selected and not processed, the present invention can be applied to the case where this embodiment may be combined with the third embodiment so that the sale is predicted on the basis of selection of actual sales data respectively having patterns equal to price change patterns in a predetermined price change range, to obtain gross profit to thereby decide a price to maximize the gross profit or the present invention can be applied to the case where this embodiment may be combined with the third embodiment so that the actual sales data are weighted. Accordingly, not only the relation between price and sale can be predicted but a well-fitted optimum price in the future can be predicted on the basis of the prediction of the relation between price and sale and can be proposed.

Figure 33:
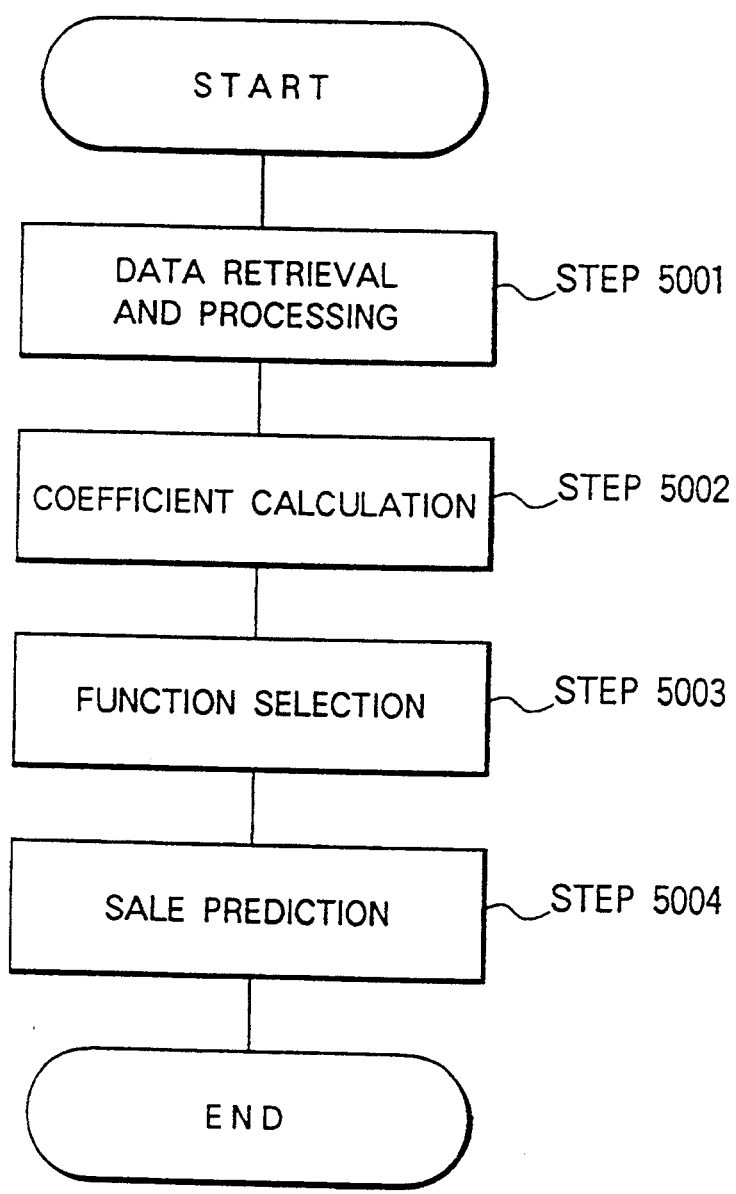
FIG. 33 is a schematic flow chart showing the operation of a system as a sixth embodiment of the present invention.
Figure 34:
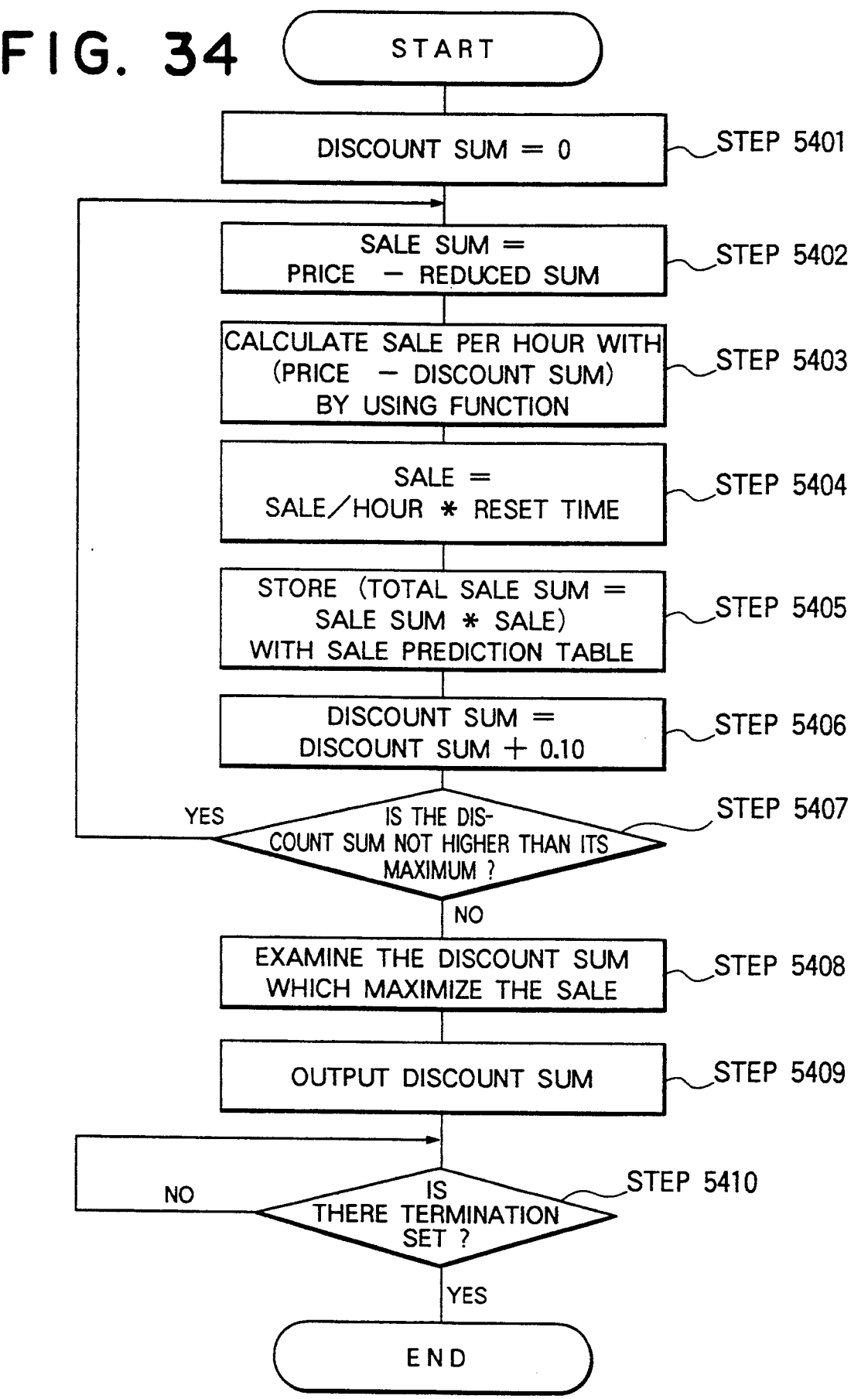
FIG. 34 is a detailed flow chart of the sale prediction portion depicted in FIG. 33.

FIGS. 33 to 36 show a sixth embodiment of the present invention in which the setting of the optimum price (by date) in the fifth embodiment is used for decision of a discount amount of money for items such as perishable foods and daily delivery goods subjected to price change at every time zone in one day. FIG. 33 is a flow chart showing the operation of this system, FIG. 34 is a detailed flow chart of the sale prediction, and FIGS. 35 and 36 show examples of the scene.

The operation of this system will be described hereunder with reference to FIG. 33.

(Step 5001): Data Retrieval

When the code of an item to be subjected to sale prediction, the maximum discount amount of money to be allowed and the term (by time) of sales data used in analysis are registered, the tradename, regular price and dead stock of the item are retrieved and displayed as shown in FIG. 35 and, at the same time, sales data by time such as price and sale corresponding to the item to be subjected to sale prediction are retrieved from the sales table 131 which stores sales data by time such as price and sale. In this case, sales data by time such as price and sale are stored in the sales table 131.

(Step 5002): Coefficient Calculation

Function coefficients for all functions registered in the function table 122 are calculated on the basis of the retrieved data.

(Step 5003): Function Selection

An optimum function is selected out of the functions subjected to the coefficient calculation.

(Step 5004): Sale Prediction

A price to maximize the amount of money for the sale in the registered price change range is predicted by using the selected function and outputted. The detailed flow thereof will be described hereunder. Although this embodiment has shown the case where the price change such as reduction in price is made by time, the point of time for starting the price change, the point of time for terminating the price change, the price and the sale may be stored as the sales data 131 in the case where the price change is made at arbitrary time.

The detailed flow of the sale prediction in the step 5004 will be described with reference to FIG. 34.

(Step 5401)

The discount amount of money is set to zero.

(Step 5402)

An amount of money (=price−discount amount) for the sale of one article corresponding to the discount amount is calculated.

(Step 5403)

The sale per hour corresponding to the amount of money for the sale of one article is predicted by using the selected function.

(Step 5404)

Sale=sale per hour * rest time (Step 5405)

The total amount of money for the sale (=amount of money for the sale of one article * sale) is calculated and stored in the predicted sale table.

(Step 5406)

The discount amount is increased by $0.10.

(Step 5407)

A judgment is made as to whether the discount amount is not higher than the maximum discountable amount. When the discount amount is not higher than the maximum discountable amount, the situation of the routine goes back to the step 5402.

(Step 5408)

The relation between discount amount and sale to maximize the total amount for the sale is examined on the basis of the predicted sale table.

(Step 5409)

The discounted price, the discount amount and the sale to maximize the total amount of money for the sale are displayed as shown in FIG. 36.

(Step 5410)

Termination is monitored, so that the routine is terminated when termination is set. Accordingly, not only the relation between price and sale can be predicted but an optimum discounted price to minimize the chance loss and maximize the profit can be estimated by well-fitted prediction on the basis of the prediction of the relation between price and sale and can be proposed.

Figure 37:
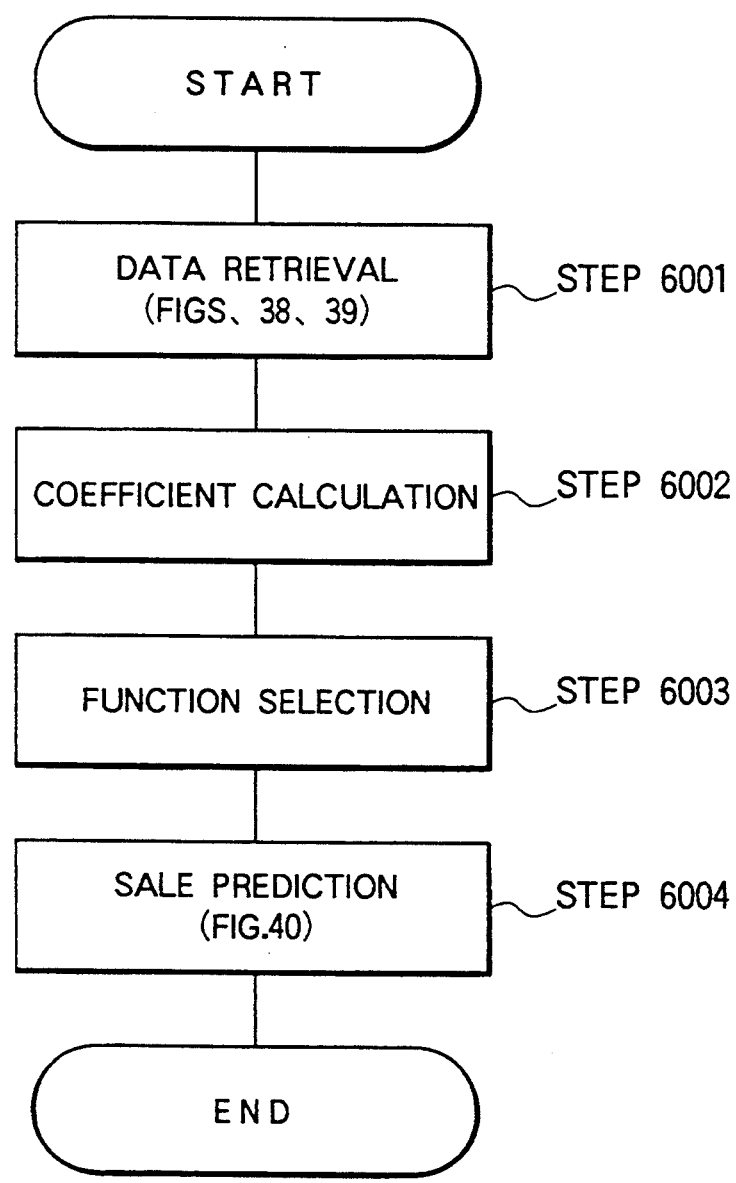
FIG. 37 is a schematic flow chart showing the operation of a system as a seventh embodiment of the present invention.
Figure 38:
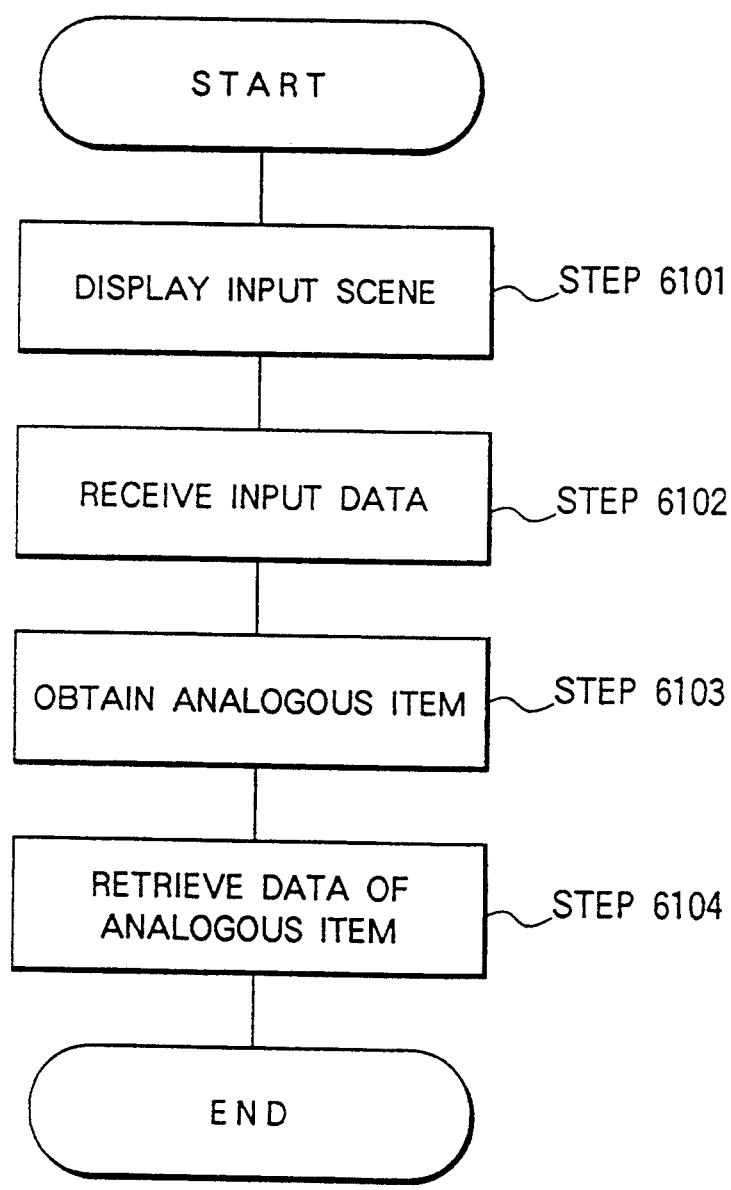
FIG. 38 is a detailed flow chart of the data retrieval portion depicted in FIG. 37.
Figure 39:
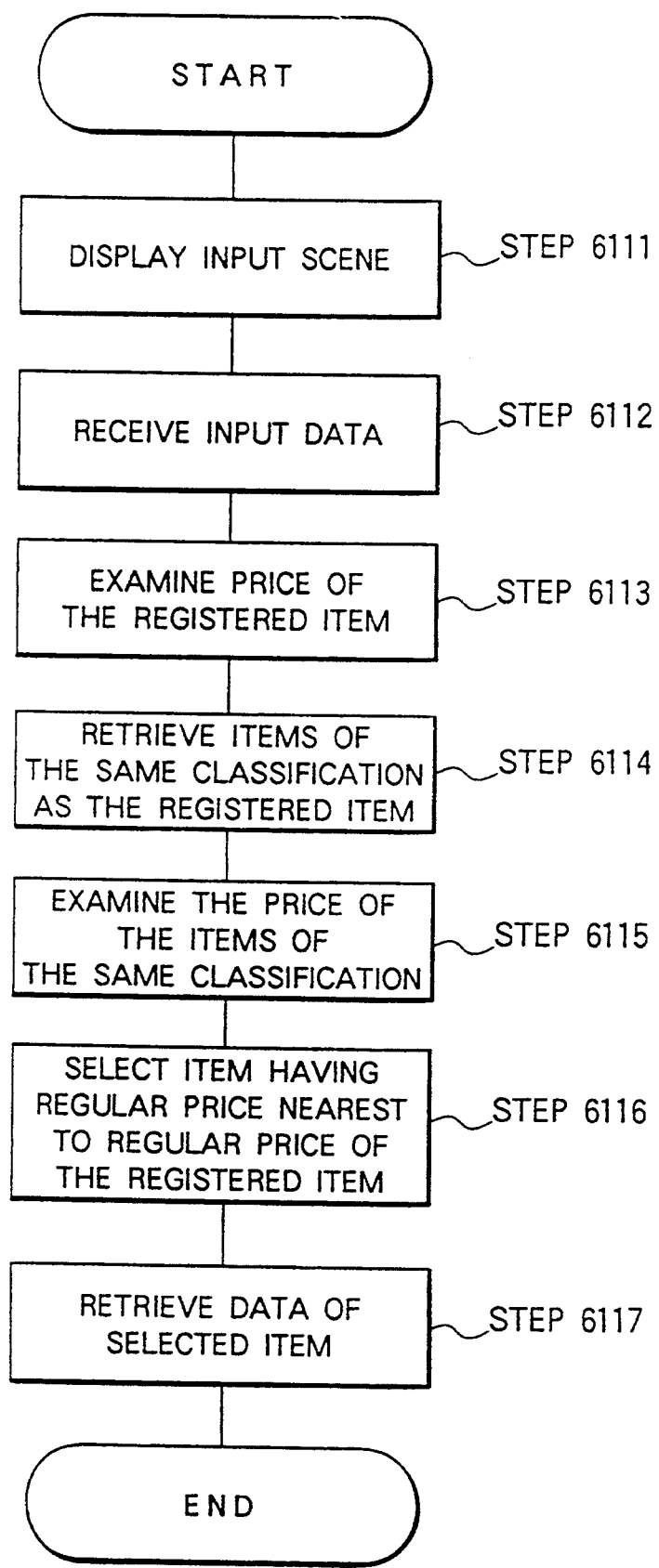
FIG. 39 is a second detailed flow chart of the data retrieval portion depicted in FIG. 37.
Figure 40:
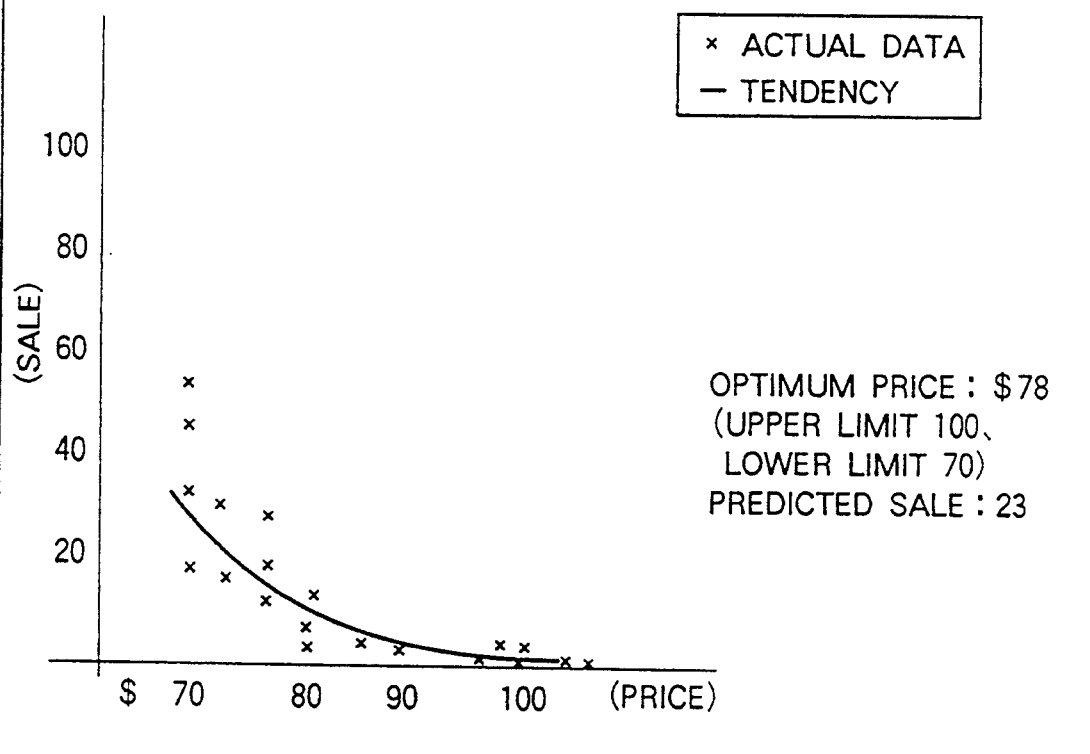
FIG. 40 shows an example of the output scene in the seventh embodiment.

FIGS. 37 to 42 show a seventh embodiment of the present invention which is applied to the case where the price change data of an item to be subjected to sale prediction is nonexistent in the memory or little existent as the number of the past price change data to make prediction difficult. FIG. 37 is a flow chart showing the operation of this system, FIGS. 38 and 39 are detailed flow charts of the data retrieval, FIG. 40 shows an example of the output scene, and FIGS. 41 and 42 show examples of the table used for the retrieval of analogous data.

The operation of this system will be described hereunder with reference to FIG. 37.

(Step 6001): Data Retrieval

When the code of an item to be subjected to sale prediction, the set price and the term of sales data used in analysis are registered, data related to an item analogous to the item to be subjected to sale prediction are retrieved from the memory having sales data such as price and sale by item on the basis of the registration. The detailed flow charts thereof are shown in FIGS. 38 and 39.

(Step 6002): Coefficient Calculation

Function coefficients for all functions registered in the function table 122 are calculated on the basis of the retrieved data.

(Step 6003): Function Selection

An optimum function is selected out of the functions subjected to the coefficient calculation.

(Step 6004): Sale Prediction

As shown in FIG. 40, price and sale data predicted by using the selected function, a graph of price versus actual sale of the analogous item retrieved and the predicted sale corresponding to the set price are outputted. This system may be combined with the first embodiment so that a judgment is made as to whether data allowed to be subjected to sale prediction are existent in the memory. On the basis of the judgment, this system can carry out the flow chart in the first embodiment when there is any data in the memory and can carry out the flow chart in this embodiment when there is no data in the memory, so that data related to the analogous item may be retrieved only in the case where there is no data related to the registered item to be subjected to sale prediction.

A first example of the detailed flow of the data retrieval in the step 6001 in FIG. 37 will be described with reference to FIG. 38.

(Step 6101)

When the system is started, an input scene as shown in FIG. 7 is displayed. A user inputs the code of an item to be subjected to sale prediction, the set price thereof and the term of actual price and sale data of an item analogous to the item used in analysis are inputted.

(Step 6102)

The code of the item to be subjected to sale prediction, the set price thereof and the term of the actual price and sale data of the item analogous to the registered item used in analysis are received.

(Step 6103)

The analogous item is retrieved from an analogous item table having combinations of item codes relational to the analogous item code as shown in FIG. 41 on the basis of the received input data. In the case of FIG. 41, the item identified by the item code 11111111 in the half-tone dot-meshed portion is regarded as a typical analogous item and selected. Here, the analogous item code is selected from items having the price change of not lower than a predetermined value and is stored in the table preliminarily.

(Step 6104)

The sale and the price for the registered term, of the analogous item identified by the selected analogous item code are retrieved from the sales table in the memory. Although this embodiment has shown the case where analogous items large in the number of price change data are preliminarily defined in the analogous item table, the present invention can be applied to the case where such analogous items may be selected on the input scene by the user. In the case where there are a plurality of analogous items, the actual sales data of the items may be used directly or one item may be selected from the items. Also in the case where one item is selected from the items, the selection may be made automatically by the system or manually by the user. Furthermore, the system may retrieve the analogous item on the basis of the classified item characteristic code, the regular price and the like without direct use of the analogous item table. The flow of the data retrieval in this case will be described hereunder.

A second example of the detailed flow of the data retrieval in the step 6001 in FIG. 37 will be described with reference to FIG. 39.

(Step 6111)

When the system is started, an input scene as shown in FIG. 7 is displayed. A user inputs the code of an item to be subjected to sale prediction, the set price thereof and the term of actual price and sale data of an item analogous to the item used in analysis are inputted.

(Step 6112)

The code of the item to be subjected to sale prediction, the set price thereof and the term of the actual price and sale data of the item analogous to the registered item used in analysis are received.

(Step 6113)

The regular price of the registered item is examined on the basis of the received input data.

(Step 6114)

Items of the same classified group as the registered item are retrieved from the classified item table as shown in FIG. 42 on the basis of the received input data.

(Step 6115)

The sale and price data for the registered term, of all items identified by the same group of classified item codes are retrieved from the sales table in the memory.

(Step 6116)

An item having the nearest regular price to the regular price of the registered item is selected out of the retrieved items identified by the same group of classified item codes.

(Step 6117)

The sale and the price for the registered term, of the selected item code are used as analogous item sales data. Although this embodiment has shown the case where the analogous item is selected on the basis of the agreement in regular price, the present invention can be applied to the case where other standards such as sale and profit per one article may be used. Or a plurality of standards such as the agreement in regular price, the agreement in sale, the agreement in profit per one article, and the like may be used in combination. Accordingly, the sale of an item having no price change to make sale prediction based on the price change difficult can be predicted on the basis of analogous items.

Figure 43:
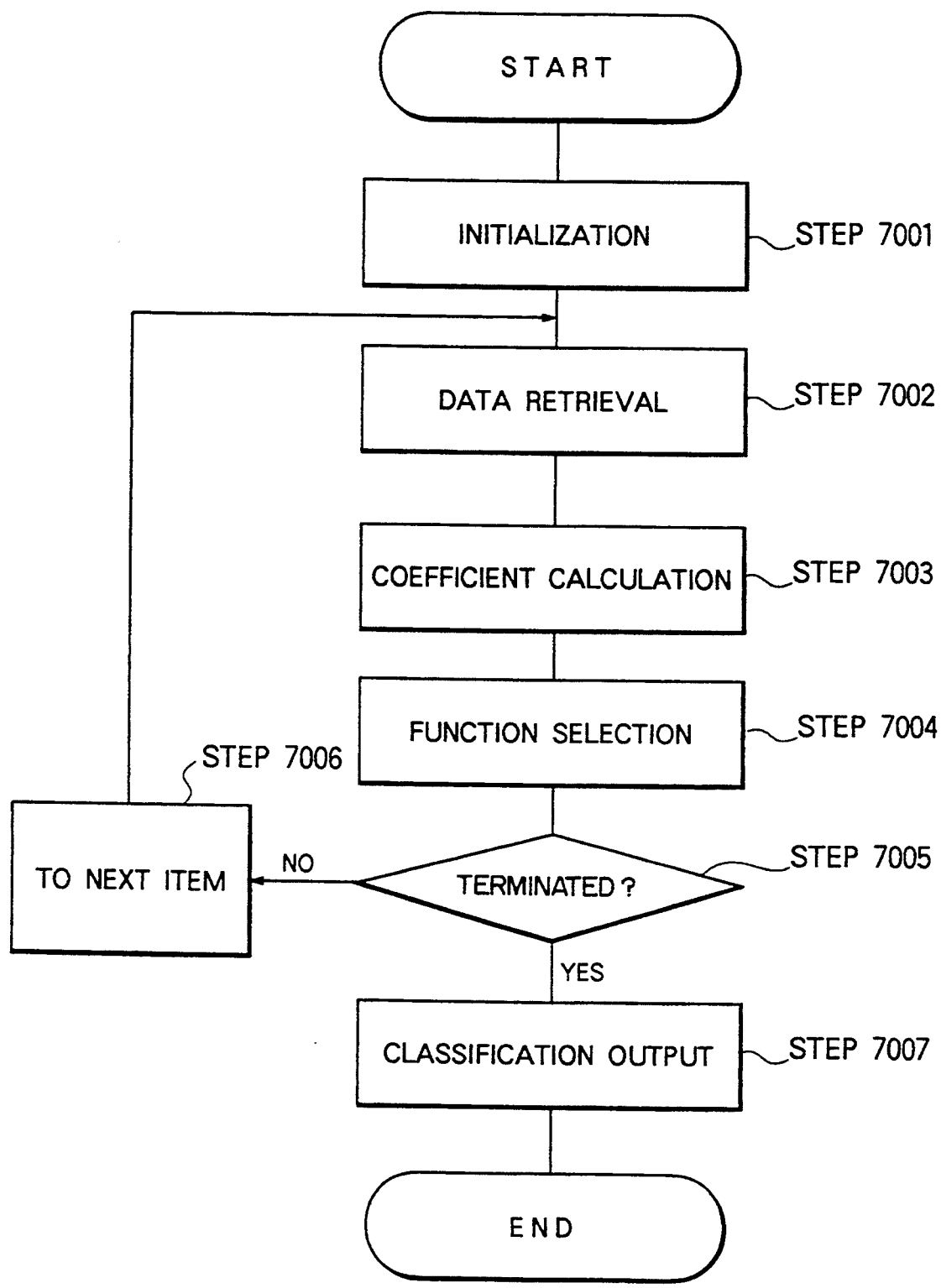
FIG. 43 is a flow chart showing the operation of a system as an eight embodiment of the present invention.
Figure 44:
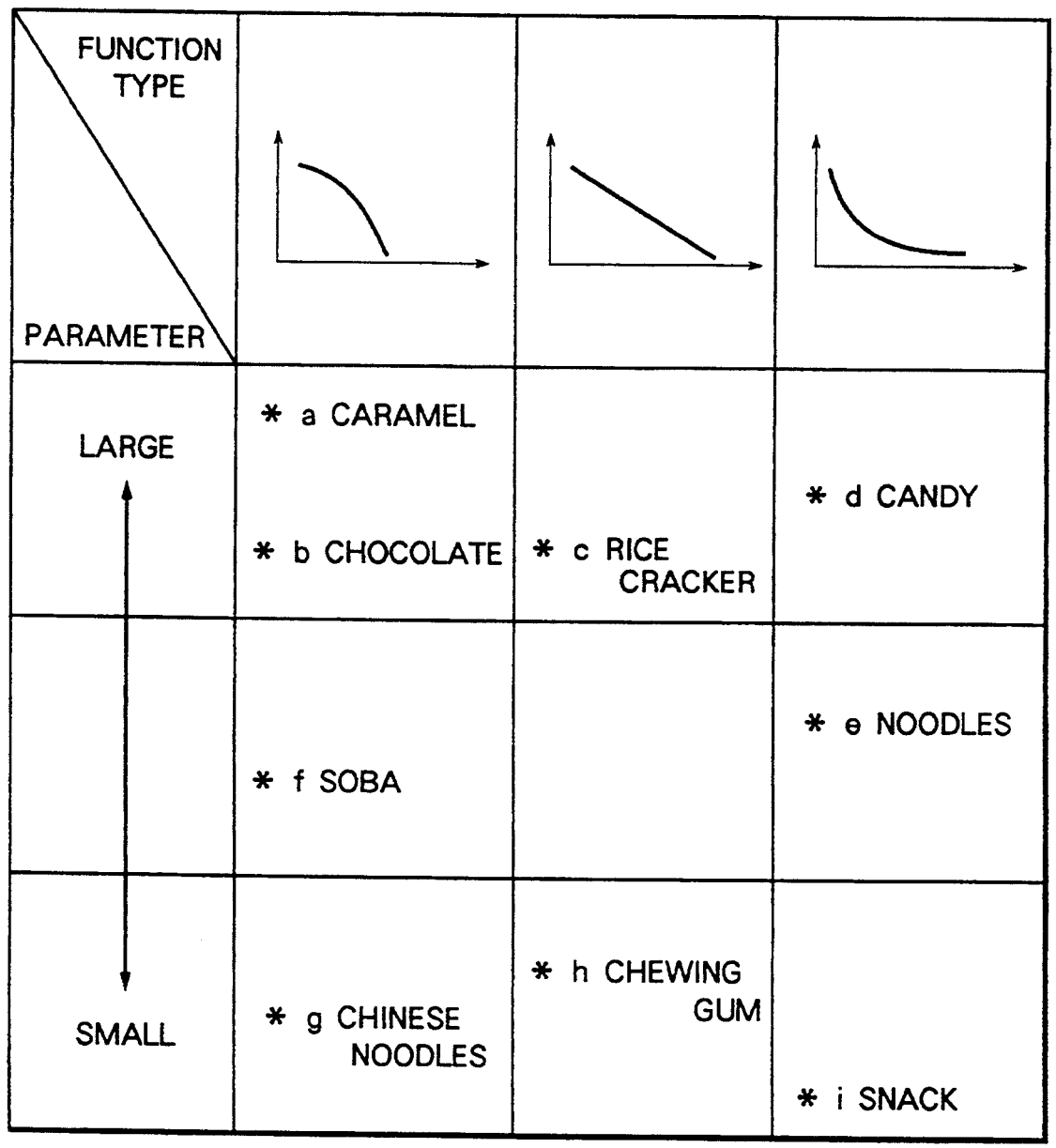
FIG. 44 shows an example of the output scene in the eighth embodiment.

The embodiments of from the first embodiment to the seventh embodiment have shown the case where sale prediction is made through inputting of an item to be subjected to sale prediction. An eighth embodiment of the present invention shows the case where the system calculates the relation between price and sale of all items (or all items being large in the number of price change data to be allowed to be subjected to sale prediction) on the basis of an instruction given by an operator without inputting of any item, to thereby classify the items on the basis of the relation between price and sale. FIG. 43 is a flow chart showing the operation of this system, and FIG. 44 shows an example of the output scene.

The operation of this system will be described with reference to FIG. 43.

(Step 7001): Initialization

The retrieval term and the item code are set. The retrieval term is set by inputting through the scene. The minimum item code selected out of a plurality of items stored in the memory (for example, sales table in FIG. 10) having sales data such as price and sale by item is initialized as the given item.

(Step 7002): Data Retrieval

Data related to the given data are retrieved from the memory having sales data such as price and sale by item.

(Step 7003): Coefficient Calculation

Function coefficients for all functions registered in the function registration portion are calculated on the basis of the retrieved data.

(Step 7004): Function Selection

An optimum function is selected out of the functions subjected to the coefficient calculation.

(Step 7005): Confirmation of Completion for All Items

A judgment is made as to whether the aforementioned procedure is completed with respect to the all items (the routine is completed when there is no item code larger than the item code of the given item). When the procedure is completed, the situation of the routine goes to step 7007. When the procedure is not yet completed, the situation of the routine goes to step 7006.

(Step 7006): To the Next Item

The item is shifted to the next item (the item having the next largest item code) and then the situation of the routine goes back to the step 7002.

(Step 7007): Classification Table Output

The items are classified by the functions and outputted. FIG. 44 shows an example of the output form. In this case, the function type and the size of the function parameter a (which has the largest influence on the value of the function when the value of the variable is changed) are used respectively as the abscissa and as the ordinate to thereby classify the items. In each of the graphs, the abscissa represents the price, and the ordinate represents the sale. In the case of a caramel, it is found that the sale decreases suddenly when the price is not smaller than a certain value. In the case of a rice cracker, it is found that the sale is proportional to the price. In the case of confectionery, the sale increases suddenly when the price is not larger than a certain value.

Although this embodiment has shown the case where two-dimensional classification is employed, linear classification or classification based on three or more dimensions may be employed. The classification of the items may be based on other factors than the function type and the parameter a. Accordingly, the relation between item and price can be observed at a glance, so that it can be utilized for strategy on price and sale.

Although the respective embodiments have been described in detail, the steps in the embodiments may be selected freely. In this case, a configuration necessary for embodiments allowed to be selected may be provided in this system so that the steps in the embodiments can be selected freely through the input device. A menu for selecting the steps in the embodiments may be provided on the display device so that the steps can be selected freely by the user.

What is claimed is:

1. A merchandise analysis system for predicting the sale of a registered item, comprising:
    an input means for registering an item and for setting a term for analysis;
    a sales data table having data of sale versus price of a plurality of items including the item registered and the term for analysis set in said input means;
    a retrieval means connected to said table and said input means for searching said table for sales data corresponding to the registered item and the analysis term;
    a function table connected to said retrieval means and said sales data table having various functions respectively fitted to data of sale versus price;
    a dispersion measure table for storing errors obtained with respect to the data of sale versus price respectively retrieved from said sales data table on the basis of said functions:
    an analysis means connected to said function table and to said dispersion measure table for determining one function which gives the smallest one of said errors and the values of parameters therefor; and
    a display means connected to said dispersion measure table for displaying a predicted sale for a registered price inputted through said input means obtained by substituting the determined parameters into said one function.

2. The merchandise analysis system according to claim 1, further comprising:
    a stock table for storing stock of said items;
    calculating means for calculating a difference between said stock and said predicted sale; and
    means for transmitting signals respectively expressing ordering of said items by the number of said difference obtained from said calculating means.

3. The merchandise analysis system according to claim 1, further comprising:
    a price change table means for judging one among three patterns of "upward tendency", "downward tendency" and "constant tendency" with respect to said registered item on the basis of a comparison between the registered price of said registered item inputted through said input means and an actual price of the same item on the preceding day; and
    means for selecting sales data having a same price change pattern as said judged pattern to output the actual price of the same item on the preceding day, searching said sales data table for sales data corresponding to said registered item and said analysis term.

4. The merchandise analysis system according to claim 1, further comprising a processing means for multiplying said sales data by a predetermined coefficient determined depending on the date of sale, when searching said sales data table for the sales data corresponding to said registered item and said analysis term.

5. The merchandise analysis system according to claim 1 further comprising:
    means for calculating gross profits of said registered item respectively with respect to a plurality of prices of said registered item within a range between an upper-limit price and a lower-limit price inputted through said input means, on the basis of a cost price of said registered item; and
    a gross profit predicting means for calculating and displaying the items between the predicted sale of said registered item and said respective gross profits to thereby decide the price for a maximum one of said items.

6. The merchandising analysis system according to claim 1, wherein:
    sales data changing with the passage of time on one day are contained in said sales data table; and
    the price is reduced by a predetermined amount successively up to a maximum discountable amount of money in accordance with a sales rest time of one day and the maximum discountable amount inputted through said input means, and the items of said reduced prices and the predicted sales data corresponding to said reduced prices, so that the optimum price and sale corresponding to the maximum item of discount price and sale are obtained and displayed by said display means.

7. The merchandise analysis system according to claim 1,
    including an analogous item table for storing, as relational data, codes of various items analogous to a certain item; and
    said certain item is registered through said input means, one item to be substituted for said certain item is selected from said plurality of items to thereby calculate the predicted sales data of the substitute item so that the predicted sales data are displayed.

8. The merchandise analysis system according to claim 1, wherein said analysis means comprises:
    first analysis means for determining values of parameters in said functions, each to have a smallest error using said function table; and second analysis means for determining said one function having a smallest error among said functions, each having said each smallest error using said dispersion measure table.

9. A merchandise analysis system for predicting the sale of a registered item, comprising:
an input device;
an output device;
a processor for executing data processing on data of the sale;
a storage device;
a function table containing a plurality of functions;
a sales table containing sales data;
means for retrieving data pertaining to the price and actual sale of the registered item for an analysis term in accordance with a code of the registered item and the analysis term inputted through said input device;
a regression analysis means which selects functions successively from said function table, obtains a standard deviation of errors from errors between a respective predicted sale of the registered item based on the selected functions and an actual sale with respect to all the retrieved data, obtains the standard deviation of the minimum error with respect to all the functions in said function table and function parameters corresponding to the minimum error, and stores in said storage device a dispersion measure table in which the standard deviation of the minimum error corresponding to the function having said function parameters is registered with respect to each of all the functions;
a function decision means for selecting a function having the minimum standard deviation of error out of all the functions stored in said dispersion measure table; and
means for obtaining a predicted sale on the basis of the selected function and the registered price inputted through said input device, the predicted sale being outputted from said output device.

10. The merchandise analysis system according to claim 9, wherein said processor includes:
means for obtaining a price change pattern on the basis of the registered price and at least one recent price among the retrieved data;
means for generating a price change table on the basis of the retrieved data and for storing said price change table in said storage device; and
a data selection means for selecting data having a pattern similar to said price change pattern by reference to said price change table, by which the predicted sale is obtained on the basis of the selected data.

11. The merchandise analysis system according to claim 9, wherein said processor includes a data processing portion for applying a weight to data to be weighted according to a weighing condition so as to obtain weighted data, the number of which is increased to be equal to a numerical value of said applied weight and for storing the weighted data in said storage device in the form of a table, so that the predicted sale can be obtained on the basis of the weighted data.

12. The merchandise analysis system according to claim 9, wherein said processor includes means for outputting, through said output device, the retrieved data and the selected function in the form of a graph, as well as the registered price and the predicted sale.

13. The merchandise analysis system according to claim 9, wherein
said input device is also used for inputting therethrough a registered price alteration range; and
said processor includes means for obtaining gross profits by subtracting cost prices from a plurality of prices within said registered price alteration range and multiplying the predicted sale in each to obtain a suitable price of a largest gross profit in accordance with the function selected by said function decision means.

14. The merchandise analysis system according to claim 13, wherein said processor includes means for outputting, through said output device, the retrieved data and the selected function in the form of a graph, as well as the optimum price and the predicted sale corresponding to the optimum price.

15. The merchandise analysis system according to claim 9, wherein:
said input device is also used for inputting therethrough both the maximum discountable amount and the analysis term by hour; and
said processor includes means for calculating the sale on the basis of the function selected by said function decision means under an assumption that reduction in price is successively continued till a predetermined point of time is reached to obtain amounts of money corresponding to the sale to thereby select an optimum price out of prices not higher than a price corresponding to the maximum discountable amount to thereby obtain a maximum amount of money out of the amounts of money corresponding to the respective prices.

16. The merchandise analysis system according to claim 15, wherein said processor includes means for outputting, through said output device, the optimum price, a discount amount corresponding to the optimum price and the predicted sale.

17. The merchandise analysis system according to claim 9, wherein said processor includes means for determining whether the quantity of sales data related to the registered item is smaller than a predetermined value: and
means for selecting an item analogous to the registered item in the case where the quantity of sales data related to the registered item is smaller than said predetermined value, so that the predicted sale of the analogous item is obtained and outputted as the predicted sale of the registered item through said output device.

18. The merchandise analysis system according to claim 17, wherein said processor includes means for outputting, through said output device, the retrieved data and the selected function in the form of a graph, as well as the registered price and the predicted sale.

19. A merchandise analysis system for analyzing the relation between sale and price by item by using sales data for a registered analysis term, said system comprising:
an input device;
an output device;
a processor for executing data processing on sales data;
a storage device;
a function table containing a plurality of functions;
a sales table containing sales data;
means for selecting an item so as to retrieve data concerning the price and actual sale of the selected item for the analysis term in response to the entry of the analysis term through said input device;

a regression analysis means which selects functions successively from said function table, obtains a standard deviation of errors from errors between a respective predicted sale of said selected item based on the selected functions and an actual sale with respect to all the retrieved data, obtains a standard deviation of minimum error with respect to all the functions in said function table and function parameters corresponding to the minimum error, and stores in said storage device a dispersion measure table in which the standard deviation of the minimum error corresponding to the function having said function parameters is registered with respect to each of all the functions; and a function decision means for selecting a function having the minimum standard deviation of error out of all the functions stored in said dispersion measure table;

whereby items are successively selected and functions respectively having the minimum standard deviations of errors are obtained successively with respect to successively selected items so that an item distribution table having an axis representing a type of function and another axis representing a parameter of function is outputted from said output device.

20. The merchandise analysis system according to claim 19, wherein a linear item distribution table having an axis representing the type of function or the parameter of function is outputted through said output device.

* * * * *